United States Patent [19]

Gray, III et al.

[11] Patent Number: 5,752,073
[45] Date of Patent: May 12, 1998

[54] DIGITAL SIGNAL PROCESSOR ARCHITECTURE

[75] Inventors: Donald M. Gray, III, San Francisco; David L. Needle, Alameda, both of Calif.

[73] Assignee: CagEnt Technologies, Inc., Santa Clara, Calif.

[21] Appl. No.: 501,163

[22] Filed: Jul. 11, 1995

Related U.S. Application Data

[63] Continuation of Ser. No. 1,463, Jan. 6, 1993.

[51] Int. Cl.$^6$ .................................................. G06F 9/00
[52] U.S. Cl. ................... 395/800.35; 395/800.01; 395/381; 395/561
[58] Field of Search ............................ 395/800, 376, 395/381, 384, 561; 364/DIG. 1

[56] References Cited

U.S. PATENT DOCUMENTS

| | | | |
|---|---|---|---|
| 3,900,886 | 8/1975 | Coyle et al. | 358/82 |
| 3,909,789 | 9/1975 | Hotley et al. | 395/595 |
| 4,079,454 | 3/1978 | Sorenson et al. | 364/DIG. 1 |
| 4,149,184 | 4/1979 | Giddings et al. | 358/81 |
| 4,219,877 | 8/1980 | Vladimirov et al. | 364/554 |
| 4,243,984 | 1/1981 | Ackley et al. | 340/703 |
| 4,247,106 | 1/1981 | Jeffers et al. | 273/85 G |
| 4,338,661 | 7/1982 | Tredennick et al. | 364/200 |
| 4,418,993 | 12/1983 | Lipton | 352/57 |
| 4,472,037 | 9/1984 | Lipton | 352/57 |
| 4,521,014 | 6/1985 | Sitrick | 273/1 GC |

(List continued on next page.)

FOREIGN PATENT DOCUMENTS

| | | | |
|---|---|---|---|
| 0 329 418 A2 | 8/1989 | European Pat. Off. | G06F 1/04 |
| 0 437 630 A1 | 7/1991 | European Pat. Off. | G09G 5/36 |
| 0 487 267 A2 | 5/1992 | European Pat. Off. | H04N 9/76 |

(List continued on next page.)

OTHER PUBLICATIONS

Intel Corporation, "82750DB Display Processor", Specification (Feb. 1991), pp. 1–1 thru 1–56.

Intel Corporation, "82750PB Pixel Processor", Specification (Feb. 1991), pp. 1–57 thru 1–119.

Intel Corporation, "The 2920 Analog Signal Processor Design Handbook", Aug. 1980, chaps. 1, 3, 6 and 7.

(List continued on next page.)

*Primary Examiner*—Alyssa H. Bowler
*Assistant Examiner*—Walter D. Davis
*Attorney, Agent, or Firm*—Fenwick & West LLP

[57] ABSTRACT

A digital signal processing architecture is inherently cyclical in nature, by providing a timer which can be programmed to reset the processor and return to the first instruction periodically, typically once each sample of the input sample stream. Pipeline operation is enhanced through the use of a double buffering system in which operands are latched into the first stage of a double buffer as soon as they are ready, but they are transferred to the second stage only when the last-ready operand is available and the computation unit is ready to receive the operands. The computation unit receives the operands in the second stage of the buffers. The processor communicates with an external unit via a random access memory and a plurality of FIFOs. Each FIFO is associated with a respective location in the random access memory. Whenever the processor retrieves a value from one of these locations in the random access memory, control means automatically refills that location from the corresponding FIFO. Similarly, whenever the processor writes data to one of the locations corresponding to an output FIFO, control means automatically recognizes that and copies the data into the corresponding output FIFO. Output FIFO writes may be emulated by an address latch and a data latch in a path to the FIFOs. The processor also includes instructions with a "write-back" bit, a novel register addressing mode, a "branch from" instruction, an invisible move function, and an operand mask register.

8 Claims, 8 Drawing Sheets

U.S. PATENT DOCUMENTS

| | | | |
|---|---|---|---|
| 4,521,770 | 6/1985 | Rhyne | 340/703 |
| 4,523,226 | 6/1985 | Lipton et al. | 358/88 |
| 4,562,463 | 12/1985 | Lipton | 358/88 |
| 4,572,509 | 2/1986 | Sitrick | 273/85 G |
| 4,580,782 | 4/1986 | Ochi | 273/86 R |
| 4,583,117 | 4/1986 | Lipton et al. | 358/92 |
| 4,635,516 | 1/1987 | Giannini et al. | 84/1.01 |
| 4,674,051 | 6/1987 | Fischer | 364/443 |
| 4,731,848 | 3/1988 | Kendall et al. | 381/63 |
| 4,754,270 | 6/1988 | Murauchi | 340/731 |
| 4,771,279 | 9/1988 | Hannah | 340/801 |
| 4,772,882 | 9/1988 | Mical | 340/709 |
| 4,785,393 | 11/1988 | Chu et al. | 364/200 |
| 4,792,850 | 12/1988 | Liptoh et al. | 358/92 |
| 4,805,098 | 2/1989 | Mills, Jr. et al. | 364/900 |
| 4,814,976 | 3/1989 | Hansen et al. | 364/200 |
| 4,817,149 | 3/1989 | Myers | 381/1 |
| 4,824,106 | 4/1989 | Ueda et al. | 273/1 E |
| 4,827,249 | 5/1989 | Chauvel et al. | 340/703 |
| 4,847,604 | 7/1989 | Doyle | 340/706 |
| 4,847,608 | 7/1989 | Bouron | 340/747 |
| 4,857,901 | 8/1989 | Lathrop | 340/703 |
| 4,879,676 | 11/1989 | Hansen | 364/748 |
| 4,884,876 | 12/1989 | Lipton et al. | 350/347 E |
| 4,908,858 | 3/1990 | Ohno | 381/1 |
| 4,918,434 | 4/1990 | Ueda et al. | 340/703 |
| 4,918,436 | 4/1990 | Johary | 340/799 |
| 4,931,751 | 6/1990 | Keller et al. | 332/108 |
| 4,939,672 | 7/1990 | Meadows | 364/521 |
| 4,945,479 | 7/1990 | Rusterholz et al. | 364/DIG. 1 |
| 4,951,230 | 8/1990 | Dalrymple et al. | 364/521 |
| 4,951,232 | 8/1990 | Hannah | 364/522 |
| 4,953,073 | 8/1990 | Moussouris et al. | 364/200 |
| 4,959,779 | 9/1990 | Weber et al. | 364/200 |
| 4,960,384 | 10/1990 | Singer et al. | 439/155 |
| 4,967,268 | 10/1990 | Lipton et al. | 358/92 |
| 4,969,647 | 11/1990 | Mical et al. | 273/85 G |
| 4,974,187 | 11/1990 | Lawton | 364/728.01 |
| 4,979,033 | 12/1990 | Stephens et al. | 358/92 |
| 4,982,342 | 1/1991 | Moribe et al. | 364/518 |
| 4,988,892 | 1/1991 | Needle | 307/269 |
| 5,014,134 | 5/1991 | Lawton et al. | 358/261.3 |
| 5,027,270 | 6/1991 | Riordan et al. | 364/200 |
| 5,038,297 | 8/1991 | Hannah | 364/518 |
| 5,046,097 | 9/1991 | Lowe et al. | 381/17 |
| 5,051,737 | 9/1991 | Akeley et al. | 340/747 |
| 5,063,441 | 11/1991 | Lipton et al. | 358/88 |
| 5,068,911 | 11/1991 | Resnikoff et al. | 382/56 |
| 5,070,479 | 12/1991 | Nakagawa | 395/575 |
| 5,073,964 | 12/1991 | Resnikoff | 382/41 |
| 5,075,842 | 12/1991 | Lai | 395/425 |
| 5,081,574 | 1/1992 | Larsen et al. | 395/375 |
| 5,081,645 | 1/1992 | Resnikoff et al. | 375/1 |
| 5,091,717 | 2/1992 | Carrie et al. | 340/703 |
| 5,091,720 | 2/1992 | Wood | 340/721 |
| 5,101,446 | 3/1992 | Resnikoff et al. | 382/56 |
| 5,113,285 | 5/1992 | Franklin et al. | 359/465 |
| 5,113,490 | 5/1992 | Winget | 395/119 |
| 5,121,191 | 6/1992 | Cassereau et al. | 358/13 |
| 5,125,671 | 6/1992 | Ueda et al. | 273/437 |
| 5,155,768 | 10/1992 | Matsuhara | 380/23 |
| 5,222,244 | 6/1993 | Carbine et al. | 395/800 |
| 5,235,677 | 8/1993 | Needle et al. | 395/131 |

FOREIGN PATENT DOCUMENTS

| | | | |
|---|---|---|---|
| 83/01391 | 4/1983 | WIPO | A63F 9/22 |
| 90/15381 | 12/1990 | WIPO | G06F 3/153 |
| 90/15383 | 12/1990 | WIPO | G06F 9/00 |
| 90/15385 | 12/1990 | WIPO | G06F 12/00 |
| 90/15395 | 12/1990 | WIPO | G06F 15/62 |
| 90/15396 | 12/1990 | WIPO | G06F 15/62 |
| 91/02308 | 2/1991 | WIPO | G06F 9/44 |
| 91/02309 | 2/1991 | WIPO | G06F 9/44 |
| 91/12588 | 8/1991 | WIPO | G06F 15/72 |
| 91/19272 | 12/1991 | WIPO | G06K 9/36 |
| 92/02897 | 2/1992 | WIPO | G06K 9/36 |

OTHER PUBLICATIONS

AT&T Microelectronics, "AT&T DSP3210 Digital Signal Processor—The Multimedia Solution", Data Sheet, Mar. 1993.

Commodore–Amiga, Inc., "Amiga Hardware Reference Manual", Chap. 5, Audio Hardware, Addison–Wesley Publishing Company, Inc. (1991).

Clark, R. Lawrence, "a Linguistic Contribution to GOTO–less Programming", Datamation (Dec. 1973), vol. 19, No. 12, pp. 62–63.

Motorola, Inc., "DSP56000/DSP56001 Digital Signal Processor User's Manual" (1990).

Mano, *Computer Engineering: Hardware Design*, Prentice–Hall Inc., 1988 pp. 338–346.

A. CONTROL INSTRUCTION FORMAT:

| 15 | 14 13 12 | 11 | 10 | 9 8 7 6 5 4 3 2 1 0 |
|---|---|---|---|---|
| 1 | MODE | FLG SEL | FLAG_ MASK | BCH_ADDRESS |
|  | 1  0 | 1 | 0 | 9 8 7 6 5 4 3 2 1 0 |

B. ARITHMETIC INSTRUCTION FORMAT:

| 15 | 14 13 12 | 11 | 10 9 8 | 7 6 5 4 | 3 2 1 0 |
|---|---|---|---|---|---|
| 0 | NUM_ OPS | M2 SEL | AMX: ALU_MUX_A ALU_MUX_B | ALU | BS |
|  | 1  0 | | 1 0 | 3 2 1 0 | 3 2 1 0 |

C. IMMEDIATE OPERAND FORMAT:

| 15 | 14 | 13 | 12 11 10 9 8 7 6 5 4 3 2 1 0 |
|---|---|---|---|
| 1 | 1 | JST -FY | IMMEDIATE_VAL |
|  |  |  | 12 11 10 9 8 7 6 5 4 3 2 1 0 |

FIG. 7

D. NON-REGISTERED OPERAND FORMAT:

| 15 | 14 | 13 | 12 | 11 | 10 | 9 8 7 6 5 4 3 2 1 0 |
|---|---|---|---|---|---|---|
| 1 | 0 | 0 | X | WB1 | D_I | OP_ADDRESS (Direct or Indirect) |
|  |  |  |  |  |  | 9 8 7 6 5 4 3 2 1 0 |

E. REGISTERED 1- or 2-OPERAND FORMAT:

| 15 | 14 | 13 | 12 | 11 | 10 9 | 8 | 7 6 5 4 | 3 | 2 1 0 |
|---|---|---|---|---|---|---|---|---|---|
| 1 | 0 | 1 | WB2 | WB1 | NUM RGS | R2_ D_I | R2 | R1_ D_I | R1 |
|  |  |  |  |  |  |  | 3 2 1 0 | | 3 2 1 0 |

F. REGISTERED 3-OPERAND FORMAT:

| 15 | 14 | 13 12 11 10 9 | 8 | 7 6 5 4 | 3 | 2 1 0 |
|---|---|---|---|---|---|---|
| 0 | R3_ D_I | R3 | R2_ D_I | R2 | R1_ D_I | R1 |
|  |  | 3 2 1 0 | | 3 2 1 0 | | 3 2 1 0 |

| Clock Tick | Loaded Into PC | Loaded Into NRC |
|---|---|---|
| 0 | Addr containing Branch to Target Addr | X |
| 1 | Address of Word Following Branch Instruction and containing BFM | Branch Instruction |
| 2 | Branch Target Address | BFM Instruction |
| 3 | BFM target Address | First Instruction of Branch Target Stream |
| 4 | 1 + BFM Target Address | First Instruction of BFM Target Stream |

*FIG. 8*

| RMAP | LOGIC FUNCTION | No. In EI | No. In I | No. In EO |
|---|---|---|---|---|
| Odd | Twiddle = x | 4 | 8 | 4 |
| 100 | Twiddle = y | 8 | 0 | 8 |
| 101 | Twiddle = !y | 0 | 16 | 0 |
| 110 | Twiddle = x & y | 8 | 4 | 4 |
| 111 | Twiddle = x \| y | 4 | 4 | 8 |

*FIG. 10*

DIGITAL SIGNAL PROCESSOR ARCHITECTURE

This application is a Continuation of Ser. No. 08/001,463, filed Jan. 6, 1993, now abandoned.

A portion of the disclosure of this patent document contains material which is subject to copyright protection. The copyright owner has no objection to the facsimile reproduction by any one of the patent document or the patent disclosure as it appears in the Patent & Trademark Office patent file or records, but otherwise reserves all copyright rights whatsoever.

BACKGROUND OF THE INVENTION

1. Field of the Invention

The invention relates to digital signal processor architectures and, more particularly, to cyclical machines for performing digital signal processor functions.

2. Description of Related Art

In a typical digital signal processing system, a varying analog signal is sampled at some periodic rate and converted to a digital value. The sequence of digital values is then processed according to a signal processing algorithm which may represent, for example, a low-pass filter, a high-pass filter, a band-pass filter, or any of a number of other functions. Typically the calculations to be performed are the same for each sample in the input sequence. The result is another sequence of digital values which can then be reconverted to analog form.

The signal processing algorithm may be performed "off-line" meaning the input sequence of values is stored, the processing takes place on all of the input values, and the resulting values are then reconverted to analog form. Off-line digital signal processing is useful if the processing hardware is slow and/or a large number of calculations need to take place. It cannot be used for real time applications, however, in which the output is expected substantially simultaneously, or at least in a pipelined manner, with the input. It also cannot be used if the input stream will be continuous and there is not enough memory to store all the input values while the processing takes place.

Real time digital signal processing requires fast, powerful hardware to perform the number of calculations required between each sample of the input signal. For many algorithms the calculations involve repetitions of a multiply-and-add-to-accumulator function. The number of these calculations that can be performed by the hardware between "cycles" (input samples) directly limits the signal processing work which can be accomplished by the device. For example, if it is desired that the device perform a multi-pole low-pass filtering function, the number of multiply-add calculations that the device can perform per sample sets a hard limit on the number of poles which the filter can have. Viewed another way, the higher the desired filtering quality, the lower the sampling frequency will have to be in order to permit the required number of calculations between cycles. A lower sampling frequency reduces the maximum frequency component which the system can handle in the analog input signal without causing aliasing.

In compact disc (CD) audio applications, input data samples always arrive at a fixed standard rate such as 4:4.1 kHz for a stereo pair. In some systems and for some purposes, the fixed rate is 176.4 KHz. Live CD signals must be processed in real time. The performance of a given hardware architecture with respect to these signals, therefore, can be measured by the number of calculations which the hardware can perform between samples occurring at a constant, predefined sampling frequency.

In order to maximize performance, many digital signal processors use a pipelined architecture and/or incorporate extensive auxiliary hardware. Additional hardware is expensive, however, and could not be readily used in lower-priced consumer directed equipment. In the consumer market, the key is to identify and include only those hardware features which yield a performance improvement worth more than the costs required to implement them.

SUMMARY OF THE INVENTION

Accordingly, it is an object of the present invention to provide a digital signal processing architecture which overcomes some or all of the above disadvantages.

It is another object of the present invention to provide a digital signal processing architecture which is optimized for audio or fixed-input-sample-frequency applications.

According to the invention, roughly speaking, a digital signal processing architecture is provided which is inherently cyclical in nature. A timer is provided which can be programmed to reset the processor and return to the first instruction periodically, typically once each sample of the input stream.

In another aspect of the invention, pipeline operation is enhanced through the use of a double buffering system in which operands are latched into the first stage of a double buffer as soon as they are ready, but they are transferred to the second stage only when the last-ready operand is available and the computation unit is ready to receive the operands. The computation unit receives the operands in the second stage of the buffers.

In another aspect of the invention, a processor communicates with an external unit via a random access memory and a plurality of FIFOs. Each FIFO is associated with a respective location in the random access memory. Whenever the processor retrieves a value from one of these locations in the random access memory, control means automatically refills that location from the corresponding FIFO. Similarly, whenever the processor writes data to one of the locations corresponding to an output FIFO, control means automatically recognizes that and copies the data into the corresponding output FIFO. Output FIFO writes may be emulated by an address latch and a data latch in a path to the FIFOs.

In another aspect of the invention, a processor is provided for which certain operands can include a "write-back" bit, which causes the result of an operation automatically to be written back to a corresponding one of the operands.

In another aspect of the invention, a novel register addressing mode is supported in a processor.

In another aspect of the invention, a processor is provided in which an instruction following a branch instruction in memory may mandate another branch from the target instruction stream after a predetermined number of instructions.

In another aspect of the invention, apparatus is provided for moving data in response to one instruction, without affecting the progress of a computation which is taking place simultaneously in response to another instruction.

In another aspect of the invention, an operand mask register is provided which permits doing many instructions using one re-used constant.

BRIEF DESCRIPTION OF THE DRAWINGS

The invention will be described with respect to particular embodiments thereof, and reference will be made to the drawings, in which:

3

Figure 1:
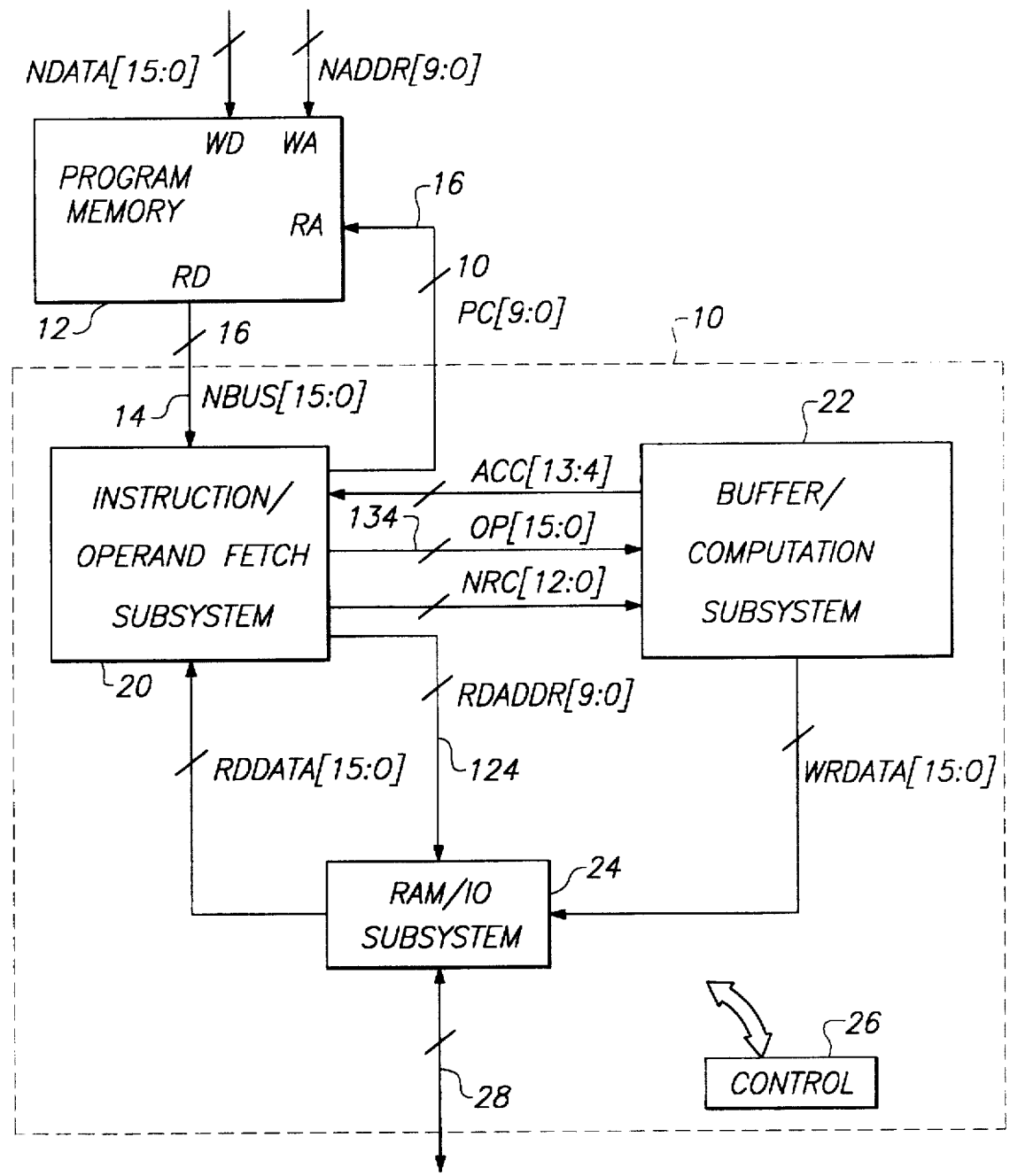
Figure 2:
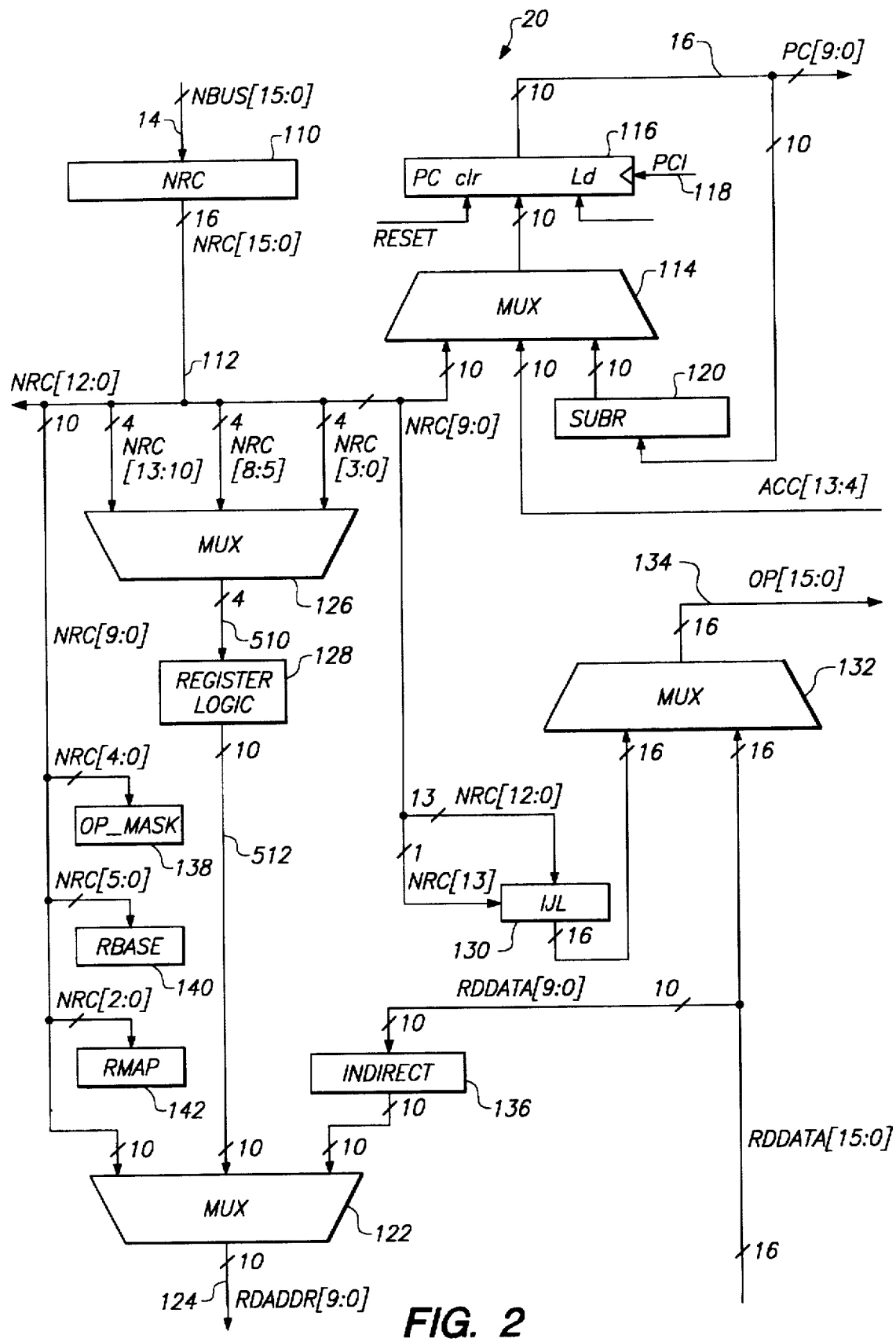
Figure 3:
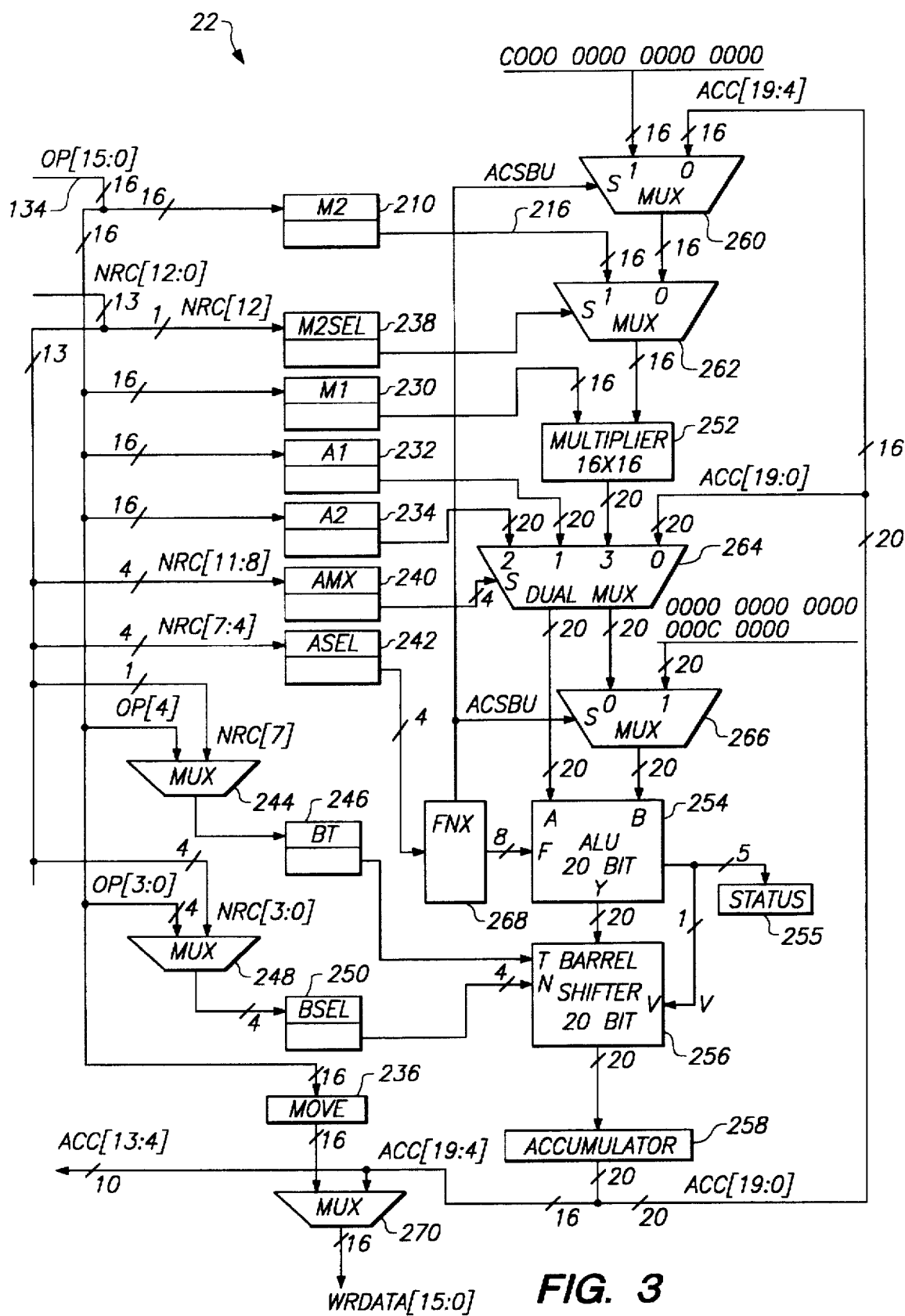
Figure 4:
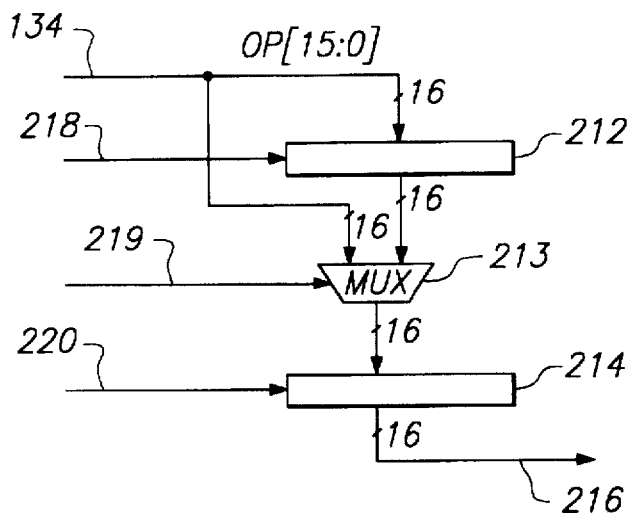
Figure 6:
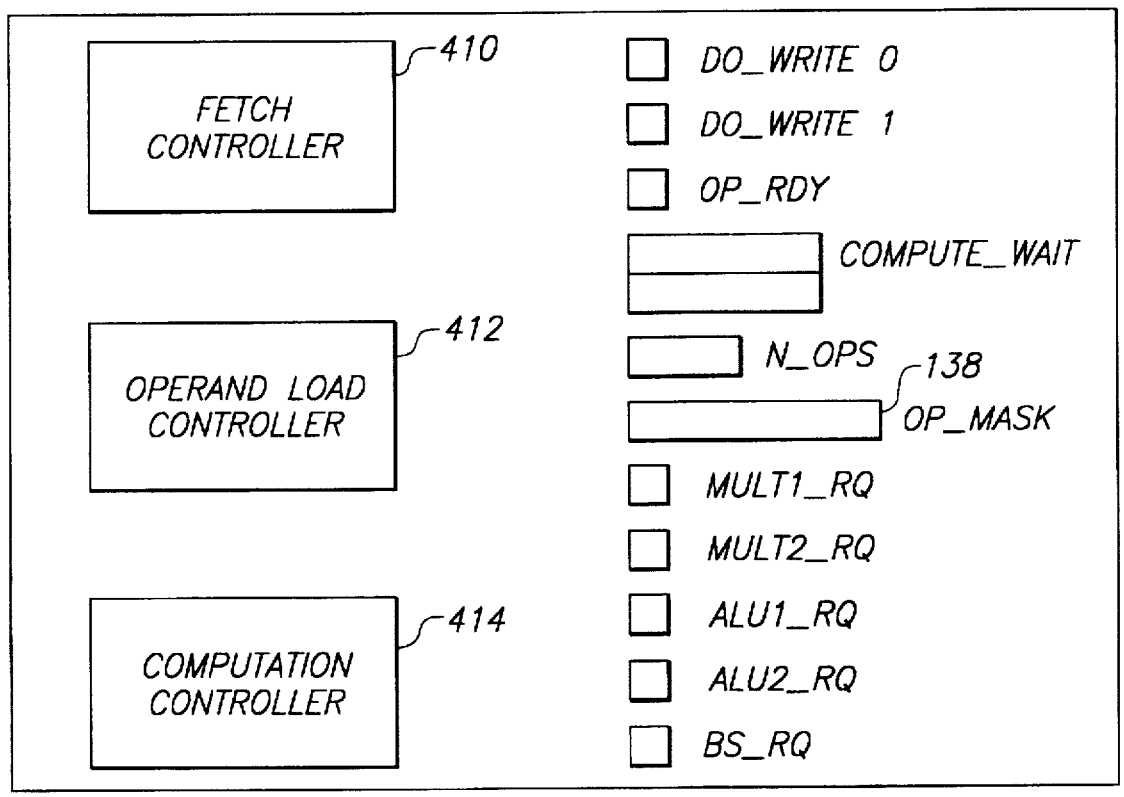
Figure 5:
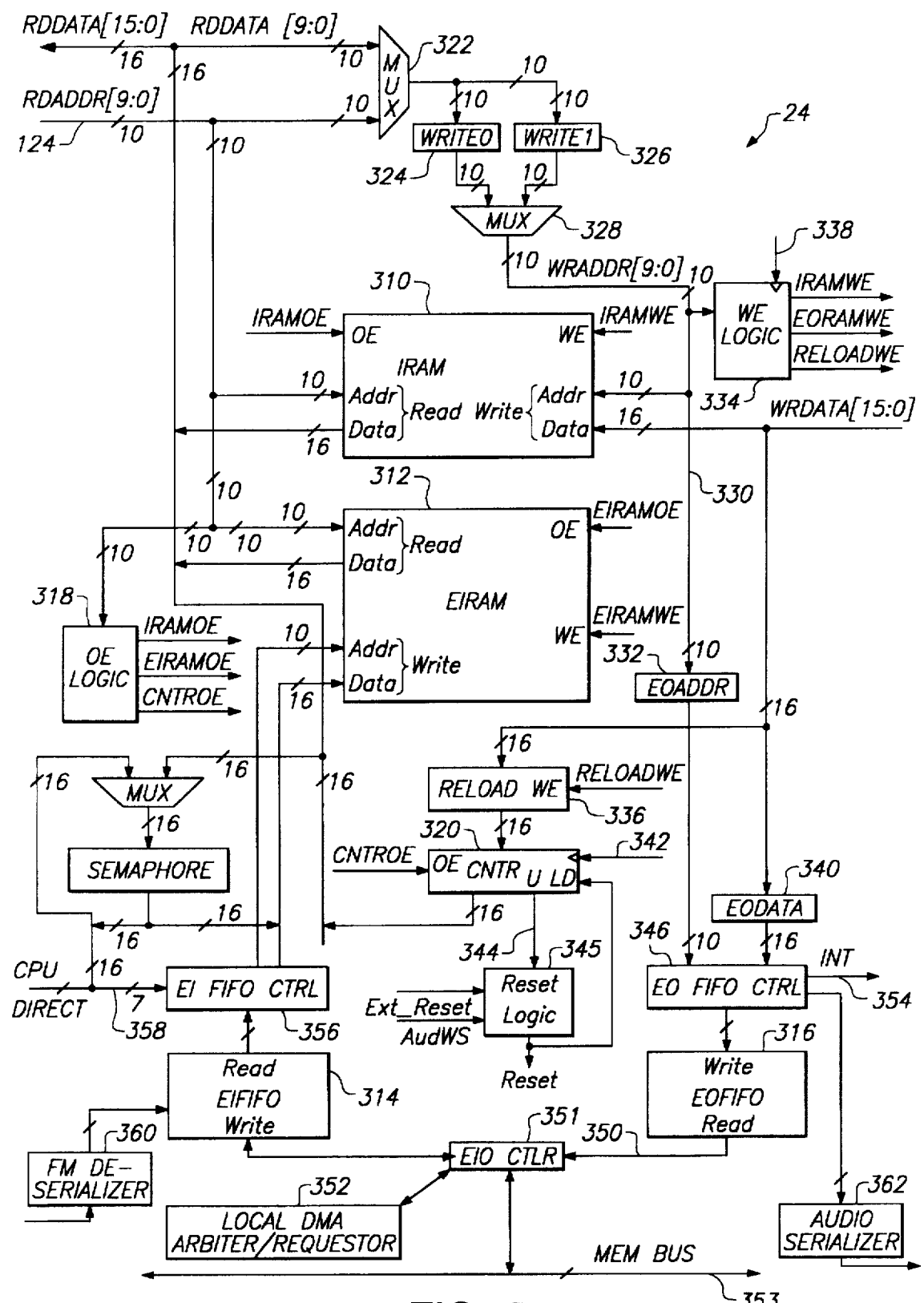
Figure 9:
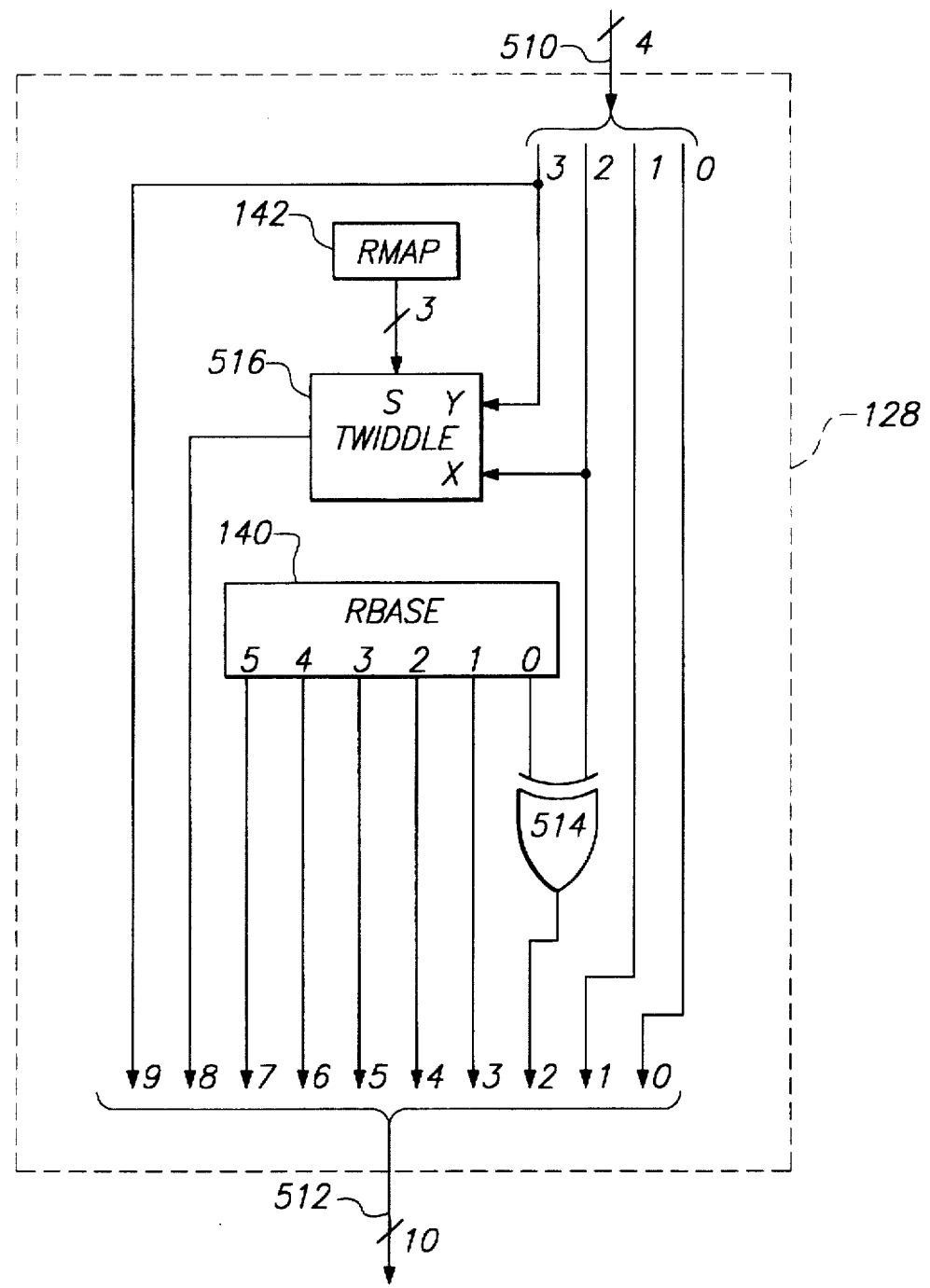

FIG. 1 is a simplified block diagram of digital signal processing apparatus according to the invention;

FIG. 2 is a block diagram of the instruction/operand fetch subsystem shown in FIG. 1;

FIG. 3 is a block diagram of the buffer/computation subsystem as shown in FIG. 1;

FIG. 4 is a block diagram of one of the double buffers shown in FIG. 3;

FIG. 5 is a block diagram of the RAM/IO subsystem shown in FIG. 1;

FIG. 6 is a symbolic diagram of the control unit shown in FIG. 1;

FIG. 7 illustrates the instruction and operand formats for the processor of FIG. 1;

FIG. 8 illustrates the instruction pipeline of the processor of FIG. 1;

FIG. 9 is a block diagram of the register logic shown in FIG. 2; and FIG. 10 defines the operation of twiddle logic of FIG. 9.

DETAILED DESCRIPTION

FIG. 1 is a simplified block diagram of computer system which may incorporate the present invention. It includes, among other things, a digital signal processor (DSP) 10, and a dual port program memory unit 12. The DSP 10 is provided together with the program memory 12 on a single chip and may be designed as a single unit. Instructions are provided in 16-bit words from the read port of program memory 12 to the processor 10 over an NBUS bus 14, from program memory addresses specified by the processor 10 over a 10-bit PC bus 16. The system may include other elements as well, for example, a host CPU for writing digital signal processor program instructions into program memory 12, and for occasionally providing or reading parameters of a program running in the DSP 10. When an external source such as a microprocessor writes program instructions to program memory 12, it does so via the write port address lines NADDR[9:0] and data lines NDATA[15:0].

The digital signal processor 10 includes three main subsystems: an instruction/operand fetch subsystem 20, a buffer/computation subsystem 22, and a RAM/IO subsystem 24. The instruction/operand fetch subsystem 20 generally performs instruction sequencing, branching, immediate justification and register address decoding. The buffer/computation subsystem generally performs operand synchronization functions, and arithmetic and logic functions on the incoming data stream. The RAM/IO subsystem generally performs scratch pad memory functions for the buffer/computation subsystem 22, as well as data stream input and output functions. The three main subsystems of digital signal processor 10 are controlled by a control unit 26.

Only certain major bus connections between the three main subsystems are shown in FIG. 1, and they include a 16-bit operand (OP) bus 134 from the instruction/operand fetch subsystem 20 to the buffer/computation subsystem 22, a 13-bit instruction register NRC bus from the instruction/ operand fetch subsystem 20 to the buffer/computation subsystem 22, a 10-bit accumulator ACC bus from the buffer/ computation subsystem 22 to the instruction/operand fetch subsystem 20, a 10-bit read address RDADDR bus from the instruction/operand fetch subsystem 20 to the RAM/IO subsystem 24, a 16-bit write data WRDATA bus from the buffer/computation subsystem 22 to RAM/IO subsystem 24, and a 16-bit read data RDDATA bus from the RAM/IO subsystem 24 to the instruction operand fetch subsystem 20. The RAM/IO subsystem 24 additionally communicates externally to the processor 10 over lines 28.

FIG. 2 is a block diagram of the instruction/operand subsystem 20 of FIG. 1. As shown in FIG. 2, the 16-bit NBUS bus 14 from program memory 12 is connected to the input of a 16-bit NRC register 110, the output of which forms a 16-bit NRC bus 112. The low-order 10 bits NRC bus 112, NRC(9:0), are connected to a first input port of a 3-input, 10-bit wide multiplexer 114, the 10-bit output of which is connected the input of a PC register 116. The PC register 116 has a PC increment input connected to receive a PCI signal 118, and generates a 10-bit output which forms the PC bus 16. In addition to being connected to the program memory unit 12 (FIG. 1), the PC bus is also connected to the input of 10-bit SUBR register 120, the 10-bit output of which is connected to a third one of the input ports of multiplexer 114. The second input port of multiplexer 114 is connected to receive ACC(13:4) from the buffer/ computation subsystem 22. Both PC register 116 and NRC register 110 are readable directly by an external CPU by means not shown.

The low-order 10 bits NRC(9:0) of NRC bus 16 are also connected to a first input port of a 3-input, 10-bit wide, multiplexer 122, the output of which forms the 10-bit RDADDR bus 124. Three 4-bit fields of NRC bus 112 are also provided to respective first, second and third input ports of a 3-input, 4-bit wide multiplexer 126. The three fields are NRC(13:10), NRC(8:5) and NRC(3:0). The 4-bit output of multiplexer 126 is provided as an input to register logic 128, which provides a 10-bit output to a second input port of multiplexer 122. The details of register logic 128 are explained hereinafter.

The low-order 13 bits of NRC bus 112 are also connected to an input port of immediate justification logic unit 130, which provides a 16-bit output to a first input port of a 2-input, 16-bit wide multiplexer 332. Bit NRC(13) of the NRC bus 112 is also provided as a control input to immediate justification logic 130. The second input port of multiplexer 132 is connected to receive the RDDATA bus from RAM/IO subsystem 24 (FIG. 1), and the 16-bit output of multiplexer 132 is provided to the buffer/computation subsystem 22 (FIG. 1) over the OP bus 134. The low-order 10 bits of RDDATA are also provided as an input to an indirect register 136, the 10-bit output of which is connected to the third input of multiplexer 122.

The low-order 5 bits of NRC bus 112 are also provided to an OP_MASK register 138, the purpose for which is described below. Similarly, the low-order 6 bits are provided to an RBASE register 140, and the low-order 3 bits are provided to an RMAP register 142, both of which are described below.

FIG. 3 is a block diagram of the buffer/computation subsystem 22 (FIG. 1). As shown in FIG. 3, the 16-bit operand bus 134 from the instruction/operand fetch subsystem 20 is provided as a 16-bit input to an M2 double buffer 210. A double buffer, also referred to herein as a double latch, is a two-stage register in which input values are usually loaded into the first stage only, upon receipt of a clock signal while an enable signal from control unit 26 is asserted. Registers in the DSP 10 always receive a clock signal, but are enabled for latching only when an enable signal for the register stands asserted when a clock pulse arrives. The output of the first stage of a double latch is connected to the input of the second stage of the double latch, the output of which is connected to one of the input ports of the computation engine in buffer/computation subsystem 22. As will be seen, the control unit 26 loads values into the first stage of all the appropriate double latches in the buffer/computation subsystem 22 and, only when the last value is ready and the computation engine is also ready, are the values transferred to the second stage of all of the double latches. If the computation engine is ready when the last value is to be loaded into one of the double latches, the control logic loads the last value directly into the second stage of the double latch, bypassing the first stage. This saves operand load time.

FIG. 4 is a detail of the double latch 210 of FIG. 3. As can be seen, it includes a 16-bit register 212 and a 16-bit register 214. Each is a master/slave register, but other types of registers, or carefully controlled transparent latches, may be used instead. The 16-bit operand bus OP(15:0) is provided as a data input to the first-stage register 212, the 16-bit output of which is connected to one input port of a multiplexer 213. The other input port of multiplexer 213 is connected to receive OP(15:0) directly, and the output is connected to the data input of register 214. The 16-bit output of register 214 is provided as the output value 216 of the double latch 210. Each of the registers 212 and 214 also has a respective clock enable input 218 and 220, driven by control unit 26 (FIG. 1).

Returning to FIG. 3, in addition to being connected as an input value to M2 double buffer 210, the operand bus OP(15:0) 134 is also connected to provide input values to a 16-bit M1 double buffer 230, a 16-bit A1 double buffer 232, a 16-bit A2 double buffer 234, and a 16-bit MOVE register 236. The MOVE register 236 facilitates moves of data which do not require or affect the operation of the computation engine. The buffer/computation subsystem 22 also includes a 1-bit MSEL double buffer 238, the data input of which is connected to receive NRC(12) from the instruction/operand fetch subsystem 20. It also includes a 4-bit AMX double latch 240, the input of which is connected to receive NRC(11:8), and a 4-bit ASEL double latch 242, the input of which is connected to receive NRC(7:4). A 2-input, 1-bit wide multiplexer 244 is also provided, which receives OP(4) on its first input and NRC(7) on its second input. The output of multiplexer 244 is provided as an input value to a 1-bit BT double buffer 246. Similarly, a 2-input, 4-bit wide multiplexer 248 is connected to receive OP(3:0) at its first input port and NRC(3:0) at its second input port. The output of multiplexer 248 is connected to the data input of a 4-bit BSEL double latch 250.

The computation engine of buffer/computation subsystem 22 is basically constructed from a 16×16 bit multiplier 252, a 20-bit ALU 254, a status register 255, a 20-bit barrel shifter 256, and a 20-bit accumulator 258. These elements are connected to operate as a "fractional" or "rational math" machine, meaning all values are interpreted to be between −1 and 1 (including −1 but excluding 1). These individual elements are essentially conventional in design, and may, for example, be made up of macros defined in the custom integrated circuit design tools available from AT&T Microelectronics, Allentown, Pa., incorporated herein by reference. The computation engine is entirely combinational except for the status register 255 and the accumulator 258, but a particular computation may require one, two or more clock cycles ("ticks") to propagate through. Control unit 26 determines from the particular instruction being executed how many clock ticks to wait before clocking a result into status register 255 and accumulator 258.

In the computation engine, a 2-input, 16-bit wide multiplexer 260 is provided which has a '0' input port connected to receive the high-order 16 bits ACC(19:4) of the accumulator 258. The '1' input port of multiplexer 260 is connected to receive a 16-bit value made up of a carry bit C followed by 15 zeroes. C is generated by the ALU 254 on a previous computation and latched into the status register 255 as explained hereinafter. The select input for multiplexer 260 is connected to receive an ACSBU signal, the source of which is explained below. Basically, the ACSBU signal indicates that an add-carry (ADDC) or subtract-borrow (SUBB) instruction is being executed.

The 16-bit output of multiplexer 260 is connected to the '0' input port of a 2-input, 16-bit wide multiplexer 262, the '1' input port of which is connected to the second stage output of double latch 210. The select input of multiplexer 262 is connected to receive the second stage output of M2SEL double latch 238. The 16-bit output of multiplexer 262 is connected to one input port of multiplier 252. The other input port of multiplier 252 is connected to receive the second stage output of M1 double latch 230. Accordingly, whereas one input to the multiplier 252 is always an operand (M1), the other input is either another operand (M2), the accumulator value, or a carry bit, all selectably in response to M2SEL and ACSBU.

The result of a multiply in multiplier 252 is a 32-bit number including a replicated sign bit (in bits 31 and 30). Bit 31 is discarded and the remaining high order 20 bits, bits 30:11, form the 20-bit output of multiplier 252. The output of multiplier 252 is connected to the '3' input port of a dual multiplexer 264. The dual multiplexer 264 contains two independent 4-input, 20-bit wide multiplexers. The 4-bit select input to the dual multiplexer 264, which is connected to receive the second stage output of double latch 240, contains two bits which control the first multiplexer and two bits which control the second multiplexer. The '0' input port of dual multiplexer 264 is connected to receive the 20-bit ACC(19:0) value from accumulator 258, and the '1' input port is connected to receive the second stage output of A1 double latch 232. The '2' input port of dual multiplexer 264 is connected to receive the second stage output of A2 double latch 234. The A1 and A2 double latches 232 and 234 are each only 16 bits wide, and since the computation engine is a fractional machine, these are each extended to 20 bits by adding four low-order 0 bits before the dual multiplexer 264.

One of the 20-bit outputs of dual multiplexer 264 is connected to a 20-bit A input of the ALU 254. The other 20-bit output of dual multiplexer 264 is connected to the '0' input of a 2-input, 20-bit wide multiplexer 266, the '1' input of which is connected to receive a 20-bit value made up of all zeroes except for the carry bit C in bit 4. The multiplexer 266 allows 16-bit multiple precision math. The 20-bit output of multiplexer 266 is connected to the B input port of ALU 254, and the select input of multiplexer 266 is connected to receive the same ACSBU signal which is provided to the select input of multiplexer 260.

The ALU 254 has an 8-bit function select input which is provided by an FNX function translation unit 268. Four function bits are provided to FNX unit 268 from the second stage output of double latch 242, and translated by FNX unit 268 to the 8 bits required by ALU 254. FNX unit 268 also generates the ACSBU signal which controls multiplexers 260 and 266.

The ALU 254, after translation by FNX unit 268, supports 8 arithmetic and 8 logical operations. They are:

| ASEL | Type | Y |
| --- | --- | --- |
| 0000 | Arithmetic | A |
| 0001 | Arithmetic | -B |
| 0010 | Arithmetic | A + B |
| 0011 | Arithmetic | A + carry |
| 0100 | Arithmetic | A - B |
| 0101 | Arithmetic | A - borrow |
| 0110 | Arithmetic | A + 1 |
| 0111 | Arithmetic | A - 1 |
| 1000 | Logical | A |
| 1001 | Logical | NOT A |
| 1010 | Logical | A AND B |
| 1011 | Logical | A NAND B |
| 1100 | Logical | A OR B |
| 1101 | Logical | A NOR B |
| 1110 | Logical | A XOR B |
| 1111 | Logical | A XNOR B |

Operations ASEL =0000 and ASEL =1000 are handled identically by the ALU 254. Both are available since the high order bit of ASEL also specifies the type of shift, arithmetic or logical, which the barrel shifter 256 will perform. Note also that other operations might be supported in a different embodiment of the ALU, such as 16-bit increment and decrement operations.

The 20-bit output of ALU 254 is provided as an input to barrel shifter 256, the 20-bit output of which is connected to the input of accumulator 258. Barrel shifter 256 has a 4-bit N input to specify a shifting function, and a T input to specify whether the shift is to be arithmetic or logical. The T input is connected to receive the second stage output of BT double latch 246, and the N input is coupled to receive the second stage output of BSEL double latch 250. The functions performed by barrel shifter 256 are as follows:

| BSEL | FUNCTION |
| --- | --- |
| 0000 | No shift |
| 0001 | Left shift 1 |
| 0010 | Left shift 2 |
| 0011 | Left shift 3 |
| 0100 | Left shift 4 |
| 0101 | Left shift 5 |
| 0110 | Left shift 8 |
| 0111 | Clip on overflow |
| 1000 | Load operand |
| 1001 | Right shift 16 |
| 1010 | Right shift 8 |
| 1011 | Right shift 5 |
| 1100 | Right shift 4 |
| 1101 | Right shift 3 |
| 1110 | Right shift 2 |
| 1111 | Right shift 1 |

For all BSELs except 1000, the shift type (arithmetic or logical) is determined by NRC(7), which is the same as the high order bit of ASEL. Basically, if the ALU function is arithmetic, so will the shift be arithmetic. If the ALU function is logical, so will the shift be logical. If BSEL= 1000, then an operand is loaded which specifies both the shift type and a new BSEL explicitly. If the newly loaded operand is itself 1000, then the barrel shifter 256 performs a 1-bit left rotate of bits 19:4 with bit 19 being rotated into the carry bit.

The "clip on overflow" function of barrel shifter 256 essentially prevents the ALU 254 from exceeding the largest positive or negative number which can be represented in 20 bits. In this function, if the overflow (V) output of ALU 254 is set, the barrel shifter will output the largest positive number if the sign bit from the ALU 254 is negative, or the largest negative number if the sign bit from ALU 254 is positive. Clip on overflow is useful especially in digital filter applications.

As previously mentioned, the operand bus OP(15:0) is connected as an input to a 16-bit MOVE register 236. The output of the MOVE register 236 is connected to a first input port of a 2-input, 16-bit wide multiplexer 270. The second input port of multiplexer 270 is connected to receive the high-order 16 bits ACC(19:4) from accumulator 258, and the output of multiplexer 270 forms the WRDATA(15:0) bus provided to RAM/IO subsystem 24 (FIG. 1). Ten bits from accumulator 20, specifically ACC(13:4), are also provided to the instruction/operand fetch subsystem 20 as shown in FIG. 1.

FIG. 5 is a block diagram of RAM/IO subsystem 24 (FIG. 1). The major components of the RAM/IO subsystem 24 are an internal RAM (IRAM) 310, an external input RAM (EIRAM) 312, an external input FIFO (EIFIFO) 314, and an external output FIFO (EOFIFO) 316. The IRAM 310 and EI-RAM 312 are each dual-ported, 16-bit wide register files, and are mapped into a 1 k word address space as follows:

| Register Set | Address Range |
| --- | --- |
| External registers in (EI) | 000h–0FFh |
| Internal registers (I) | 100h–2FFh |
| External registers out (EO) | 300h–3FFh |

Of these addresses, many do not actually contain memory and some are assigned special purposes. The special register locations are as follows:

| | |
| --- | --- |
| 000h–06Fh | CPU coefficient space. |
| 0D0h–0DEh | EIFIFO status words. |
| 0E0h–0E3h | EOFIFO status words. |
| 0EAh | Pseudorandom noise generator (white noise) |
| 0EBh | Audio Output status read (including AUDLOCK, LFIFULL and RGTFULL. |
| 0ECh | Semaphore status read |
| 0EDh | Semaphore data word read. |
| 0EEh | PC |
| 0EFh | DSPP clock counter value, explained below. |
| 0F0h–0FCh | Input FIFOs, for example, 12 sampled sound channels and one for expansion bus peripherals if desired. |
| 0FDh–0FEh | Two additional input FIFOs, for example, for FM-synthesized sound or I²S serial input data. (I²S is an industry standard synthesized sound format.) |
| 070h–07Eh | Read corresponding input FIFO in 0F0h–0FEh, but without removing the input word from the FIFO. |
| 300h–30Fh | "Quick-Out" latches, readable by external CPU. |
| 3EBh | Write AUDLOCK; MSB sets/clears. |
| 3ECh | Semaphore ACK. |
| 3EDh | Semaphore Write. |
| 3EEh | CPU interrupt register (not shown). Any write to this address sends an interrupt to an external CPU; the data written to this address is sent as the interrupt word. |
| 3EFh | DSP clock counter reload value. Writes to this address change the DSP clock counter reload value, but do not reset the clock immediately. As will be seen, this changes the basic cycle. time of a program running in the DSP 10. Only direct writes to this address are effective. |

| | |
|---|---|
| 3F0h–3F3h | Output FIFOs, which may be used for audio reverb or data streams. |
| 3FDh | Flush output FIFO. Bits 3:0 flush output FIFOs 3:0 respectively. Forces a DMA request. |
| 3FEh–3FFh | Audio Left and Right outputs. |

Addresses 000h–0FFh are read only, as seen from outside the RAM/IO subsystem 24, and addresses 300h–3FFh are write only. Addresses 100h–2FFh are read/write, and may be accessed by the digital signal processor 10. Additionally, locations 100h–1FFh are equivalent to 200h–2FFh, and locations 000h–07Fh are equivalent to locations 080h–0FFh.

The semaphore words permit controlled communication between the DSP 10 and an external CPU. The semaphore data word can be either read or written by either the CPU or the DSP 10. The semaphore status word can only be read by either the CPU or the DSP 10. The semaphore status word contains four bits indicating respectively (1) that the CPU was the last to write to the semaphore data word, (2) that the DSP 10 was the last to write to the semaphore data word, (3) that the CPU has acknowledged the current data word, and (4) that the DSP 10 has acknowledged the current data word. When either the CPU or DSP 10 writes to the semaphore data word, the DSP 10 automatically sets the correct status bit and clears all others. When either the CPU or the DSP 10 writes to the semaphore ACK address, the appropriate ACK bit in the semaphore status register is set. Thus by reading the semaphore status register, both the CPU and the DSP 10 can determine the status of the other' activities relative to the semaphore data word and proceed accordingly.

As shown in FIG. 5, the 10-bit RDADDR bus 124, provided by instruction/operand fetch subsystem 20, is connected to the 10-bit address input of the read port of IRAM 310 as well as of EIRAM 312. RDADDR is also connected to OE logic 318, which provides output enables IRAMOE to the output enable input of IRAM 310, EIRAMOE to the output enable of EIRAM 312, CNTROE to the output enable of DSP clock counter 320, as well as various other output enables (not shown). RDADDR(9:0) bus 124 is also connected to one input port of a 2-input, 10-bit wide multiplexer 322, the output of which is connected to the input of two registers WRITE0 and WRITE1, 324 and 326, respectively. Control unit 26 determines which WRITE register will load in the value provided by multiplexer 322. These registers hold the address for writes by the DSP 10, and as explained hereinafter, also facilitate an automatic write-back function of the present embodiment.

The 10-bit outputs of the WRITE0 and WRITE1 registers 324 and 326 are provided as inputs to respective input ports of a 2-input, 10-bit wide multiplexer 328, the 10-bit output of which forms an internal WRADDR(9:0) bus 330. WRADDR(9:0) is connected to the 10-bit write address input of IRAM 310, and also to the input of a 10-bit EOADDR register 332. WRADDR is also connected to WE logic 334, which generates an IRAMWE write enable signal for IRAM 310, and EORAMWE signal for the EO address and data registers 332 and 340, and a RELOADWE signal for DSP clock reload register 336 (described below). WE logic 334 also includes a latch input 338 generated by control unit 26.

The WRDATA(15:0) bus from buffer/computation subsystem 22 is connected to the 16-bit write data input of IRAM 310. It is also connected to a 16-bit EODATA register 340, and to the input of reload register 336. As will be seen, the EOADDR register 332 and the EODATA register 340 emulate the function of the write-only random access memory locations destined for output through the EOFIFO.

When the DSP 10 resets, PC register 116 (FIG. 2) is reset to 0 and the value in reload register 336 is loaded into counter 320. The DSP 10 then begins executing the program as the counter 320 counts down in response to each tick of the system clock signal. When the counter 320 underflows, it asserts a signal on underflow line 344. Underflow line 344 is provided to reset logic 345, which also receives an externally supplied reset signal Ext_Reset. Reset logic 345 generates a reset output which resets the PC register 116 to zero, thereby restarting the program at address 0. The counter 320 is also recycled by loading in the value from reload register 336. The DSP 10 is thus an inherently cyclic machine, having a cycle time of the number of system clock ticks indicated by reload register 336. After each such number of ticks, the entire program restarts.

Illustratively, the DSP system clock may operate at 568 times a CD audio sample rate, in which case the number loaded into reload register 336 would be 565 (since various delays add three ticks to the cycle time). If one input sample is processed in each cycle, then the DSP 10 can perform 568 ticks worth of operations for each sample. 568 clock ticks provide sufficient time to perform a significant amount of digital signal processing computation on each value in the incoming audio sample stream. Note that if the value in reload register 336 is zero, cycling is disabled and the DSP 10 operates as a normal linear machine.

More specifically, the processor 10 can be reset either non-cyclically, over the Ext_Reset line shown in FIG. 5, or cyclically. Non-cyclic resets behave differently depending on whether Ext_Reset is held asserted for one or two clock ticks. Cyclic resets occur either in response to the counter 320 underflow output or in response to an externally supplied AUDWS signal. AUDWS is provided to enable an external source to dictate the cycle time of a program. Such a technique, known as audlock, is useful if the audio serializer 362 output is to be provided to an output filter which requires its own crystal. The DSP 10 can enable or disable audlock by setting or clearing an audlock bit in the processor 10 (address 3EB).

Reload register 336 is automatically set to 565 by a non-cyclic reset and is writable by DSP software and readable by an external CPU. The default value of 565 creates a 568 tick cycle which is appropriate for CD-audio rates. The counter 320 decrements continuously when the DSP is turned on and is reloaded with the current reload register 336 value when it underflows. The counter 320 is read-only by DSP software.

When there is a non-cyclic reset, the reload register 336 is loaded with 565 and the counter 320 is loaded with the prior reload register value. This means that a non-cyclic reset must be held asserted for two or more ticks to allow the 565 to propagate into the counter. This also means that if the DSP software changes the reload value in the beginning of its code and then the external non-cyclic reset is held asserted for only one tick, the DSP 10 will operate at the software selected cyclic rate rather than 568 tick cycles. CPU software should be able to issue either a one or two tick reset to the DSP 10 over the Ext_Reset line to take advantage of this. A non-cyclic hardware reset signal is always held asserted for at least two ticks and so will cause the DSP to return to a 568 tick cycle. Any non-cyclic reset zeroes all registers and latches in the DSP other than the counter and reload register. This includes a primary enable bit (not shown) bit which allows the DSP to run. The CPU must therefore restart the DSP after a reset.

Whenever the counter underflows, the DSP will be reset as previously described. All sequential logic will be zeroed and the DSP program will start afresh. If the current DSP program has to output audio data, and audlock is turned off, it must check the ready bits of the audio output FIFO to determine if there is space available. The audio FIFO is double buffered so the DSP software need only check the status every 568 ticks. Thus, programs running a cycle shorter than 568 ticks need only check the status once in the program.

If audlock is turned on, when the externally supplied AUDWS signal transits from high to low, the DSP will be reset. The DSP counter will behave as if a normal non-cyclic external reset occurred (it will reload with the current reload value) but counter underflows will not generate a DSP reset. Note that if software wishes to use the counter as a measurement of how much time is left in the cycle, it should set the reload value to indicate a cycle longer than the audlock cycle. This guarantees that the counter will not reload due to underflow and cause inaccurate readings.

Note that DSP memory is not affected in any way by any reset signal, except that a reset that occurs during a write to memory is likely to produce unpredictable datum at that location.

The 16-bit data output of the read port of IRAM 310 is connected to the RDDATA(15:0) bus provided to instruction/operand fetch subsystem 20 (FIG. 1). The data output of the read port in EIRAM 312 is also connected to the RDDATA(15:0) bus, as is the output of counter 320. The low-order 10 bits of RDDATA(15:0) bus are also provided to the second input port of multiplexer 322. The path from the read data outputs of IRAM 310 and EIRAM 312, through the multiplexer 322 and the write registers 324 and 326 to the WRADDR bus 330, is used for indirect write addressing.

Writes to addresses 300h–3FFh are, as previously mentioned, to the EO portion of DSP address space. These registers do not actually exist in the RAM/IO subsystem 24, but instead are emulated by the EOADDR register 332 and EODATA register 340. The outputs of both of these registers are connected to an EOFIFO control unit 346 which in turn writes EO data to an appropriate structure corresponding to the EO address, in an EOFIFO array 316. The EOFIFO array 316 contains four 16-bit wide, 8-word deep FIFOs corresponding to DSP address locations 3F0h–3F3h, sixteen 16-bit words (the "quick-out" latches), readable by an external CPU, a word for CPU interrupt data, and a word for the clock reload value to be read by an external CPU. The EOFIFO array 316 has separate read and write ports, and for the FIFOs, the read port is connected to a FIFO output bus 350, which is in turn connected to an input port of an EIO controller 351. The EIO controller 351 communicates bi-directionally with an external MEM bus 353. EIO controller 351 asserts DMA requests as appropriate to a local DMA arbiter/requestor 352, which in turn arbitrates with other devices in the system for control of MEM bus 353.

Writes to the two addresses of the EO portion of DSP address space which are for left and right audio output data, are coupled from the EO FIFO control unit 346 to an audio serializer 362, the output of which provides serial audio data to an output filter/DAC (not shown). Left and right audio data is provided to the serializer 362 in an alternating manner.

Since the EO addresses are intended to appear to programs running in the DSP 10 as true registers, the EO FIFO controller 346 should be able to read and pass on the data as fast as actual registers would receive the data, that is, once each tick. If a FIFO in the EO FIFO overflows, EO FIFO control unit 346 may generate an interrupt over a line 354.

The EIO controller 351 also has an output port 355 which is connected to the write port of a dual port EIFIFO FIFO array 314. The read port of EIFIFO FIFO array 314 is connected to an EI FIFO control unit 356. The EIFIFO unit 314 is an array of 15 16-bit wide, 8-word deep FIFOs, one corresponding to each of the addresses 0F0h–0FEh. The EI FIFO control unit 356 monitors the address bus RDADDR (9:0) as well as the EIRAMOE signal, and when it detects that information has been read from one of the addresses 0F0h–0FEh in EIRAM 312, it automatically reads a value from the corresponding FIFO in the EIFIFO array 314 and writes it into the location in EIRAM 312 from which the information was read. Accordingly, each time the DSP program reads a value from one of these addresses in EIRAM 312, it is replenished with a new value from an input FIFO. If the corresponding FIFO in EIFIFO array 314 is empty, then the last-read value is repeated. A FIFO underflow bit is also set in the FIFO status word, and can be set to interrupt an external CPU.

The FIFOs in EI FIFO array 314 corresponding to addresses 0FDh and 0FEh receive their input from an FM deserializer 360 rather than from the EIO controller 351. The FM deserializer 360 is one of several units which could be chosen as an input source to one of the FIFOs in the array 314, but is particularly appropriate for a digital signal processor optimized for audio applications. The input to the FM deserializer 360 is adapted to derive from a serial bit stream provided by an external audio synthesizer chip such as a Yamaha 2151. The deserializer can also accommodate serial sound data according to Philips I²S format.

The EI FIFO control unit 356 also can receive input directly from a host CPU, over lines 358. The EI FIFO control unit 356 monitors external address and data bus lines, chip selects and read/write strobes, for this purpose. The EI FIFO control unit 356 is responsible for arbitrating between data arriving from the CPU directly and data from one of the EI FIFOs to be written into EIRAM 312. Note that the EI FIFO control unit 356 has temporary storage for only two half words of data from the CPU. Thus, if a program running in the DSP 10 reads a FIFO value on many consecutive ticks, the EI FIFO control unit 356 will not be able to receive and store additional words from the CPU. Accordingly, if input values are expected from the CPU over the line 358, the program running in the DSP should not read more than four consecutive FIFO addresses without pausing for two ticks, or not more than two FIFO reads without a one-tick pause. Additionally, the DSP program should not try to read from the same FIFO on two consecutive clock ticks, since the EI FIFO controller 356 replaces read EIRAM data with new FIFO data on the tick following the tick in which is was read from EIRAM. If the DSP reads from the same FIFO on two consecutive ticks, it will receive the same word both times.

FIG. 6 is a symbolic detail of control unit 26 (FIG. 1). It comprises three finite state machines, namely a fetch controller 410, an operand load controller 412, and a computation controller 414. Roughly, the fetch controller 410 controls the operation of instruction/operand fetch subsystem 20, the operand load controller 412 controls the loading of information into the double buffers in the buffer/computation subsystem 22, and the computation controller 414 controls the operation of the computation engine in the buffer/computation subsystem 22. The control unit 26 also includes several latches for storing additional variables used by one or another of the state machines. In particular, control unit 26 includes a 1-bit DO_WRITE0 latch, which indicates that the WRITE0 latch 324 (FIG. 5) contains a valid write address, and also a DO_WRITE1 latch which indicates that the WRITE1 latch 326 contains a valid write address. The control unit 26 also includes an OP_RDY bit, which is written by the operand load controller 412 to indicate that all the operands necessary to accomplish a computation have now been loaded into the respective first stage latches of the double buffers in buffer/computation subsystem 22. The bit is read by the computation controller 414 to determine when it may begin computation. If this bit is set, and a computation is not currently in progress, the computation controller 414 automatically causes the loading of all the first stage registers into the second stage registers in the double buffers of the buffer/computation subsystem 22, clears the OP_RDY bit, and begins the computation. In order for a computation to begin immediately, if the computation engine is available when the last operand is to be loaded into one of the double latches, the last operand is loaded directly into the second stage of the double latch via multiplexer 213 (FIG. 4). Additionally, the OP_RDY latch should be designed to end up in the cleared state if the operand load controller 412 attempts to set the bit at the same time the computation controller 414 attempts to clear it. This can save a clock tick.

The control unit 26 also includes a COMPUTE_WAIT double latch. The first stage of the COMPUTE_WAIT latch is loaded by the fetch controller 410 to indicate the number of clock ticks which will be required for the compute engine to complete the next calculation. This value is loaded into the second stage of the COMPUTE_WAIT double latch when the computation begins. In this second stage, it operates as a 4-bit shift register with a 1 in the bit indicating the number of clock ticks remaining. After each clock tick, the computation controller 414 shifts the value by one bit.

The control unit 26 also includes five latches identified as MULT1_RQ, MULT2_RQ, ALU1_RQ, ALU2_RQ and BS_RQ. These bits are set by the fetch controller 410, based on an incoming instruction word, to indicate to the operand load controller 412 which of the double latches of the buffer/computation subsystem 22 need to be loaded with operands. The operand load controller 412 clears each of these bits as it obtains and loads in the specified operands. Each of the latches DO_WRITE0, DO_WRITE1, OP_RDY, and the RQ latches, may be set-reset flip-flops.

The control unit 26 also includes a 5-bit OP_MASK register which is loaded by the fetch controller 410 from bits 4:0 of an OP_MASK instruction. The OP_MASK register contains one bit corresponding to each of the request bits MULT1_RQ, MULT2_RQ, ALU1_RQ, ALU2_RQ and BS_RQ. If an OP_MASK bit is set when the fetch controller 410 is decoding an instruction to determine which operands to obtain, the fetch controller 410 is prevented from setting the _RQ bit corresponding to the OP_MASK bit which is set. Thus the computation called for in the instruction will proceed using one or more operands which were obtained for a prior instruction. In essence, masked operands become implied, and need not be re-specified in subsequent instructions. Note that a masked operand is re-used only for the same purpose for which it was used originally—the DSP 10 has no facility for moving operands among the different double buffers of FIG. 3, although that would be possible in a different embodiment.

The state machine definition for fetch controller 410 is illustrated in an emulation pseudocode in Appendix I, and the state machine definition for the operand load controller 412 is illustrated an emulation pseudocode in Appendix II.

The state machine definition for computation controller 414 is illustrated an emulation pseudocode in Appendix III. Accordingly, these machines will not be further described except as necessary for a better understanding of the invention.

The operation of the DSP 10 will now be described with respect to the instruction and operand formats illustrated in FIG. 7.

FIG. 7 illustrates the six formats which a 16-bit word fetched from program memory 12 can have. The first word is always assumed to be an instruction rather than an operand, and each instruction includes an indication of the number of operands which follow. After the appropriate number of operand words are read, the next word is again assumed to be an instruction word. Accordingly, no bit is required to indicate whether a given word is an instruction word or an operand word.

Instruction words can either be arithmetic or control instructions. If bit 15 is 0, then the instruction is an arithmetic instruction, and if bit 15 is 1, the instruction is a control instruction. Format A illustrated in FIG. 7 is the format in which control instructions are provided. Control instructions include branch instructions, move instructions and various special instructions. It includes a branch condition code in bits 14:10, made up of two mode bits (M0 and M1 in bits 14:13), a FLAG select bit S in bit 12, and two FLAGMASK bits in bits 11:10. The instruction also includes a 10-bit branch address BCH_ADDRESS in bits 9:0. In modes 01, 10 and 11, the branch condition bits are used to test the value of five status bits provided by the ALU 254. These bits are set by ALU 254 in status register 255 as follows:

| | | |
|---|---|---|
| N | Negative | Set if the ALU result is negative (high bit is high). |
| V | Overflow | After an ALU "add", set if and only if the signs of the inputs are identical and the sign of the result is different from the signs of the inputs. After an ALU "subtract", set if and only if the signs of the inputs are opposite and the sign of the result is the same as the sign of the subtrahend. |
| C | Carry | Set if the carry result from the ALU is high. |
| Z | Zero | Set if the high-order 16 bits of the ALU result are zero. |
| X | Exact | Set if the low-order four bits of the ALU result are zero. |

Together the branch condition codes can cause a branch in response to any of the following combinations of conditions:

Branch if overflow
Branch if negative
Branch if negative and overflow
Branch if equal to zero
Branch if carry
Branch if unsigned overflow
Branch if carry and zero
Branch if not overflow
Branch if positive
Branch if negative and overflow both not set
Branch if not equal to zero
Branch if carry clear
Branch if not unsigned overflow
Branch if carry and zero both not set Branch if less than (signed)
Branch if less than or equal (signed)
Branch if greater than or equal (signed)
Branch if greater than (signed)
Branch if high (unsigned)
Branch if low or the same (unsigned
Branch if exact
Branch if not exact
Branch if all zero
Branch if not all zero When a branch instruction is received in NRC 110 (FIG. 2), the fetch controller 410 detects this, tests the conditions specified, and if the branch is to be taken, loads the BCH__ADDRESS from NRC(9:0) into the PC 116 via the first port of multiplexer 114. If a computation is currently proceeding in the computation subsystem 22, the fetch controller 410 waits for it to complete before testing the conditions. If the conditions are not satisfied, then the fetch controller 410 merely increments PC register 116.

If both the mode bits M1 and MO are zero in a control instruction, then any of several special instructions may be invoked depending on the remaining bits in NRC. In particular, if NRC(12:10) are not equal to 000, then they represent one of the following instructions:

| | |
|---|---|
| JUMP | Branch always to BCH__ADDRESS |
| JSR | Jump to subroutine at BCH__ADDRESS; store current PC in SUBR register 120 |
| BFM | Branch from a branch target stream to a new BCH__ADDRESS (explained in more detail below) |
| MOVEREG | Move the following operand to the specified register, direct or indirect |
| MOVE | Move the following operand to the specified address, direct or indirect. |

If the mode is 00 and NRC(12:10) are 000, then an additional series of special instructions are indicated. These instructions are:

| | |
|---|---|
| NOP | No operation |
| BAC | Branch to address indicated by accumulator ACC(13:4) |
| RBASE | Change register base value to that specified in NRC(5:0) (explained in more detail below) |
| RMAP | Change register mapping latch to that specified in NRC(2:0) (explained in more detail below) |
| RTS | Return from subroutine to main instruction sequence |
| OP__MASK | Change operand mask bits to those specified in NRC(4:0) |
| SLEEP | Wait until reset by underflow output of counter 320 (FIG. 5) or by external reset signal. |

The mode 00 instructions are designed to execute in a single clock tick except the moves. The mode 00 instructions do not need to wait for the completion of a pending computation in buffer/ computation subsystem 22. In particular, on a JUMP instruction BCH__ADDRESS is loaded directly into PC 116 from NRC(9:0) via the first input port of multiplexer 114. The same operation occurs on a JSR except that at the same time, the return address is also latched into SUBR latch 120 from the PC(9:0) bus 16. This bus contains the address following that which contained the JSR instruction, since the PC register 116 was automatically incremented when the JSR instruction was loaded into NRC 110. Thus, by the next clock tick, after fetch controller 410 has decoded the contents of NRC 110 to determine that a JSR is specified, PC 116 already contained the return address.

The BFM instruction is typically placed after another branch to take advantage of the one clock-tick latency before the branch is actually taken. Whenever a branch is taken, the fetch controller 410 automatically sets a JUST__BRANCHED bit which is tested during the decode of each instruction loaded into NRC 110. Except if the instruction in NRC 110 is a special instruction or a BFM instruction, fetch controller 410 merely ignores the instruction in NRC 110 if JUST__BRANCHED is set, increments the PC register 116, and awaits the next instruction to be loaded into NRC 110. It also clears the JUST__BRANCHED bit. If the instruction in NRC 110 is one of a predefined set of the special instructions, then it is executed since it requires only one clock tick to accomplish. If the instruction in NRC 110 is a BFM instruction, the BCH__ADDRESS from the BFM instruction is loaded into the PC register 116 via the first input port of multiplexer 114. Branch instructions other than BFM are not executed when JUST__BRANCHED is set.

The operation of the BFM instruction can be better understood with reference to FIG. 8, which illustrates what information is loaded into the PC register 116 and the NRC register 110 on each of a sequence of five clock ticks. The figure assumes a "normal" instruction stream, which includes a branch instruction designating a branched target address followed by a BFM instruction designating a BFM target address. At clock tick 0, it is assumed that the address containing the branch instruction is loaded into the PC register 116. At clock tick 1, the branch instruction itself, pointed to by PC register 116, is loaded into the NRC 110. At the same time, PC register 116 is incremented to point to the address of the word following the branch instruction and containing the BFM instruction. The branch instruction has not yet been decoded. By the second clock tick, the branch instruction has been decoded and the branch target address is loaded into PC register 116. At the same time, however, the instruction word pointed to by PC register 116, namely the word containing the BFM instruction, is loaded into the NRC register 110.

On the third clock tick, the word then pointed to by PC register 116, now the first instruction of the branch target stream, is loaded into NRC register 110. By now the BFM instruction has been decoded and the target address specified therein is loaded into PC register 116.

By the fourth clock tick, the first instruction of the branch target stream has been decoded and no attempt is made to prevent its execution. However, the next instruction loaded into the NRC register 110 on the fourth clock tick is the instruction then pointed to by PC register 116 which is the first instruction of the BFM target stream. Also on the fourth clock tick, PC register 116 is incremented to now point to the word following the BFM target address.

Accordingly, it can be seen that the BFM instruction permits execution of a single instruction in a target stream specified by a branch instruction which immediately precedes the BFM instruction, after which control is automatically transferred to the address specified in the BFM instruction. The BFM instruction is beneficial for quickly jumping to a distant location and returning. Using BFM to accomplish such a task is faster than a traditional branch and return, since the instruction stream pipeline latency caused by a branch is reduced. The BFM instruction is beneficial also where subroutine nesting is limited. In the present embodiment, for example, subroutine nesting is limited to the one level for which a return address can be stored in SUBR register 120. The BFM instruction permits a call to what is essentially a one-instruction subroutine, without disturbing any higher-level subroutine return address which may then be stored in SUBR register 120. Further, the BFM instruction can help improve reliability of the DSP 10 in the situation where an external CPU desires to change a single instruction in the program memory 12 while the DSP 10 is running. Such an operation could be dangerous if the instruction is located in the middle of a program, but safer if it is located in a different part of the program memory 12. The BFM instruction permits the DSP 10 to retrieve and execute such a changeable instruction efficiently, without requiring the instruction to be located in the middle of the DSP program. It should be noted that the DSP 10 will execute branch target instruction only if it can be executed in one clock tick. Longer instructions, including any which require an operand in the location following the branch target instruction, will not be executed.

The BFM instruction is capable of many variations. For example, if the instruction pipeline is longer than two clock ticks, then the BFM instruction may permit more than one instruction (or a more-than-one tick instruction) to be executed from the branch target stream before control is transferred to the BFM target stream. In another variation, it can be seen that the BFM target address can be specified other than as an immediate value. Additionally, it can be seen that instructions other than branch instructions can be made available in the branch latency time period.

Referring again to FIG. 7, if the instruction in the NRC is a MOVEREG or MOVE, then the fetch controller 410 transfers control to the operand load controller 412 to execute the move. Before transferring control, the fetch controller 410 waits for the appropriate WRITE0 or WRITE1 register 324 or 326 (FIG. 5) to become available for storing the destination address, and waits for any indirection taking place in the operand load controller 412 to complete. The operand load controller 412 then loads the destination address into the appropriate write address register 324 or 326. If the instruction is a direct MOVE, then the destination address is taken from NRC(9:0) via the first input port of multiplexer 122 (FIG. 2), the RDADDR bus 124, and the second input port of multiplexer 322 (FIG. 5). If the instruction is a direct MOVEREG, then the destination address is taken from register logic 128 via the second input port of multiplexer 122, the RDADDR bus 124, and the second input port of multiplexer 322. If the instruction is an indirect MOVE or MOVEREG (i.e. a move to an indirect address), then the multiplexer 122 selects a direct address from either NRC(9:0) or register logic 128, as appropriate, onto the RDADDR bus 124. The direct address addresses the DSP memory space to combinationally generate an indirectly obtained address on the RDDATA(9:0) bus, which is selected by multiplexer 322 to the appropriate WRITE register 324 or 326.

In all such cases, the operand load controller 412 chooses the appropriate WRITE register 324 or 326 to avoid any write address which may be stored in one of these registers pending the outcome of a computation currently taking place in the compute engine of the buffer/computation subsystem 22. The fetch controller 410 then fetches the next word, which contains the operand in one of the formats C, D or E of FIG. 7, to be moved into the specified location. Format F is inappropriate since only one operand can be moved at a time, and format F is necessary only when three operands are to be specified. The operand load controller 412 controls the register decoding, immediate justification, or indirection as explained hereinafter required to place the operand onto the operand bus 134 (FIGS. 2 and 3), and to load it into the MOVE register 236 (FIG. 3).

It then controls multiplexer 270 to place the data from the move register 236 onto the WRDATA bus (FIGS. 3 and 5), and controls the multiplexer 328 to place the write address onto the WRADDR bus (FIG. 5) to write the data into the specified register address in IRAM 310, EODATA register 340, or reload register 336. It can be seen that the MOVE instruction and the MOVEREG instruction can be executed without affecting any calculation currently taking place in the compute engine of buffer/computation subsystem 22, and without needing to wait for such a computation to complete.

If the instruction in NRC register 110 is a BAC instruction (branch to accumulator), then the fetch controller 410 waits for any computation currently taking place to complete and then loads ACC(13:4) from the accumulator 258 (FIG. 3) into PC register 116 via the second input port of multiplexer 114 (FIG. 2).

If the instruction in NRC 110 is an OP_MASK instruction, then the fetch controller 410 loads the value from NRC(4:0) into OP_MASK register 138. Similarly, if the instruction in NRC 110 is an RBASE instruction, then the fetch controller 410 loads the value from NRC(5:0) into RBASE register 140, and if the instruction in NRC 110 is an RMAP instruction, then the fetch controller 410 loads the value from NRC(2:0) into RMAP register 142.

If the instruction in NRC 110 is an RTS (return from subroutine) instruction, then the fetch controller 410 loads the value from subroutine latch at 120 into PC register 116 via the third input port of multiplexer 114. Only one subroutine level is permitted in the processor 10.

If the instruction in NRC 110 is SLEEP, then the fetch controller 410 merely remains in its current state without loading any new instructions into NRC register 110. Unlike a conventional "JUMP to present address" instruction, no further fetches are made to external instruction memory after a SLEEP instruction is decoded. Any computations currently taking place in the computation engine continue through to completion, but no subsequent operations are initiated. The SLEEP instruction is useful to conclude a program, since the DSP 10 will do no further work until the program is restarted either by the underflow output 344 of counter 320 (FIG. 5) or by an external reset signal.

Arithmetic instructions are distinguishable from control instructions by the presence of a logic 0 in bit 15. Arithmetic instructions follow format B illustrated in FIG. 7. In particular, bits 14:13 indicate the number of operands which follow the instruction; bit 12, identified as M2_SEL, indicates whether an ACC/carry word or one of the operands is to be used for the second input of the multiplier 252 (FIG. 3); bits 11:8 indicate which selections should be made by the dual multiplexer 264 (FIG. 3) in providing operands to the ALU 254; bits 11:10 select the source for the 'A' input port of the ALU and bits 9:8 select the source for the 'B' input port of the ALU. Bits 7:4 contain a 4-bit function select for the ALU 254, and bits 3:0 contain a 4-bit shift amount number for the barrel shifter 256.

When an arithmetic instruction is loaded into NRC 110 (FIG. 2), the fetch controller 410 first checks the OP_RDY bit to determine whether valid operands from a previous instruction are still waiting in the first stage buffers of the double buffers in the buffer/computation subsystem 22. If OP_RDY is set, the fetch controller 410 waits for it to be cleared. The fetch controller 410 also awaits the completion of any indirect address determination currently being resolved by operand load controller 412. Once these two conditions are clear, the fetch controller 410 determines from a decode of the instruction in the NRC 110, which of the double buffers 210, 230, 232, 234 and 250 (FIG. 3) will need to be filled with operands from subsequent words. It then sets the appropriate operand request (_RQ) bits in control unit 26 (FIG. 6) corresponding to the double buffers which will need to be filled. If the OP_MASK bit corresponding to one of the operands is set, then the fetch controller 410 does not set the corresponding operand request bit. Instead, the operation will proceed by re-using the operand most recently used for that corresponding operand.

Fetch controller 410 also sets an N_OPS register with a logic 1 in the bit corresponding to the number of operands which need to be fetched (including a write address if appropriate). N_OPS is a 4-bit shift register, each bit representing a corresponding number of operands which still need to be FETCHED from program memory. For example, a 1 in bit 0 indicates that one operand needs to be fetched. A 1 in bit 1 indicates that two operands need to be fetched and so on. No more than one bit in the shift register should be active at a time. The fetch controller 410 uses NRC (14:13) in determining the number of operands as follows:

| NRC(14:13) | Number of Operands |
|---|---|
| 00 | 0, if AMX indicates that all ALU value inputs are to come from ACC(19:0) or masked operands; 4, if AMX indicates that at least one ALU value input is to come from a non-masked operand or from the multiplier 252 output. |
| 01 | 1 |
| 10 | 2 |
| 11 | 3. |

Note that an instruction may have yet another operand to load in response to a 1000 in the BS field of NRC 110 as described below. That operand is not included in the number of operands shown in the table above.

Fetch controller 410 also determines from another decode of the instruction in NRC 110, the number of clock ticks that the computation engine in buffer/computation subsystem 22 will require to complete the specified computation. It then loads the first stage of the COMPUTE_WAIT latch accordingly.

The operand load controller 412 latches the M2_SEL field from NRC 110 into the first stage of the M2_SEL double latch 238, the AMX field from NRC 110 into the first stage of AMX double latch 240, and the ALU field from NRC 110 into the first stage of ASEL double latch 242 in the buffer/computation subsystem 22. Additionally, if the value in the BS field of NRC 110 is anything but 1000, the operand load controller 412 loads the value into the first stage of BSEL double latch 250 via the second input port of multiplexer 248. Since the shift type (arithmetic or logical) depends on the ALU operation, specifically the high order bit of the ALU field of the arithmetic instruction, this bit is also loaded into the first stage of ET double latch 246 via the second input port of multiplexer 244. As explained hereinafter, only if BS=1000 is any operand fetching required to control the barrel shifter 256. The fetch controller 410 then proceeds to fetch the requested operands according to the _RQ bits in the manner described hereinafter, and the load controller 412 writes them into the respective first stages in the corresponding double buffers in buffer/computation subsystem 22. Load controller 412 is responsible for shifting N_OPS down as each operand is received and placed in its appropriate double buffer. If more operands are indicated by N_OPS than are requested by the RQ bits, then the last operand is assumed to represent a write address. The write address is calculated from this operand like any other, and is stored in an available WRITE latch 324 or 326 (FIG. 5). The corresponding DO_WRITE bit is also set (FIG. 6).

All the operand loading can take place while the computation engine of the buffer/computation subsystem 22 is performing a computation according to a previous instruction. This is because the new values written into the first stages of the double buffers in buffer/computation subsystem 22 do not affect the values in the second stages, which actually supply operands to the computation engine.

When all of the required operands are loaded, or if the instruction in NRC 110 does not require any operands, the computation controller 414 first awaits the completion of any computation then in progress in the computation engine in buffer/computation subsystem 22. If there is no computation taking place, then the computation controller 414 immediately transfers all the first-stage buffers of the double buffers into the second stages to begin the specified computation. If operands were required, then the computation controller 414 waits until the last operand is being loaded into its double buffer before transferring all the first-stage buffer information into the second stage. In the latter case, the last operand is loaded directly into the second stage of its double buffer, at the same time that all of the other first-stage buffer information is transferred to the second stage. In either case, once the computation begins, the computation controller 414 merely waits the number of clock ticks indicated by the second stage of COMPUTE_WAIT, so that the calculation may propagate completely through the computation engine. At the conclusion of the waiting period, the computation controller 414 loads the result into accumulator 258 and the ALU status output bits into status register 255.

In addition to providing a conventional write address as described above, an instruction can instead merely indicate that the result of an operation is to be written back to the address of one of the input values. As explained hereinafter, several of the operand formats can specify whether the result of a calculation is to be written back to the address that an operand came from. If it is, then the operand load controller 412 will have written the write-back address into one of the WRITE0 or WRITE1 latches 324 or 326 (FIG. 5), and set the corresponding DO_WRITE bit (FIG. 6). When the calculation is complete, if one of the DO_WRITE bits is set (either because a conventional write address was provided or because a write-back bit was set), the computation controller 414 performs the write-back by enabling the appropriate WRITE latch 324 or 326 onto the WRADDR bus 330 via multiplexer 328 (FIG. 5), and enabling ACC(19:4) onto the WRDATA bus via the second input port of multiplexer 270 (FIG. 3). The computation controller 414 also clears the corresponding DO_WRITE bit at this time. Writes can take place concurrently with the beginning of the next computation. If no DO_WRITE bit is set, the result is still available for further use in the computation engine. It should be noted that if a MOVE or MOVEREG instruction is underway at the time a result is ready to be written, the write may be delayed until the move is complete.

The DSP 10 supports six basic types of operands: instant, immediate, direct, indirect, register direct, and register indirect. The only instant operands are those present in an arithmetic instruction itself, in the BS field. As mentioned above, for any value in the BS field other than 1000, the BT and BSEL double buffers 246 and 250 (FIG. 3) are loaded with data from the NRC register 110. No fetch of a subsequent word is required to obtain the operands and load them into these double buffers. If the BS field does contain 1000, then one of the subsequently identified operands contains the information to load into these double buffers.

Operands (other than instant operands) are written to the corresponding double latches for which the _RQ bit is set (FIG. 6), in a predefined sequence. Immediate operands are identified by the presence of a '11' in bits 15:14 of an operand word. As shown in format C of FIG. 7, the immediate operand format includes a justify bit (bit 13) and 13 bits of an immediate value (bits 12:0). The justify bit indicates whether the 13-bit immediate value is to be left or right justified in a 16-bit field. If it is to be left justified, then zeros are added to the right, and if it is to be right justified, then the value is sign extended to the left. When an immediate format operand is retrieved from program memory and written to NRC register 110, the low-order 13 bits are extracted and justified by immediate justification logic 130 in accordance with NRC(13) (FIG. 2). The operand load controller 412 selects the output of immediate justification logic 130 onto the OP bus 134 via the first input port of multiplexer 132, and clocks it into the appropriate double latch in the buffer/computation subsystem 22 (FIG. 3).

Non-register direct or indirect operands are identified by the presence of '100' in bits 15:13 of the operand word. Such operands follow the format D illustrated in FIG. 7. In this format, bits 9:0 identify an operand address, bit 10 specifies whether the address is to be interpreted as direct or indirect, and bit 11 specifies whether "write-back" is desired to this operand. Any one operand may be marked for write-back except an immediate operand or a member of a 3-register group. The write-back feature speeds read-modify-write type operations and saves program space.

When a non-register direct or indirect format operand is loaded into NRC 110, the operand load controller 412 enables NRC(9:0) onto the RDADDR bus 124 (FIG. 5) via the first input port of multiplexer 122 (FIG. 2). Any address in IRAM 310 or EIRAM 312 may be read. The addressed one of these two units then outputs a data word onto the RDDATA bus. The RDDATA bus is enabled onto the OP bus 134 (FIG. 3) via the multiplexer 132 (FIG. 2), and on the next clock tick, assuming this is a direct operand address, it is loaded into the appropriate double latch in buffer/computation subsystem 22. If NRC(10) indicates that the operand address is indirect, then instead of loading the data into the appropriate double latch, the operand load controller 412 loads the low-order 10 bits of data from the RDDATA bus into the INDIRECT register 136 (FIG. 2). The output of the INDIRECT register 136 is then enabled onto the RDADDR bus 134 via multiplexer 122, and a new data value is read from either IRAM 310 or EIRAM 312 onto the RDDATA bus and provided to the OP bus 134 via multiplexer 132 (FIG. 2). If write-back bit NRC(11) is set, the operand load controller loads the address of the operand into one of the WRITE address registers 324 or 326 either from the RDADDR bus 124 via the second input of multiplexer 322, for direct addressing, or from the RDDATA bus 124 via the first input of multiplexer 322. As previously explained, the computation controller 414 will use this address to write back the computation results from the accumulator 258 (FIG. 3) to the specified address. It can be seen that non-registered immediate or directly addressed operands occupy one word of instruction space and require one clock tick to fetch and load into the appropriate double latch. Non-registered indirect addressing also uses one word of instruction space but requires two clock ticks to load the operand into the appropriate double latch. Indirect addressing modes benefit most from the write-back feature since it is the indirect address, not the direct address, which is stored in the WRITE address register. The indirection need only be resolved once in a read-modify-write situation.

The registered operand formats E and F illustrated in FIG. 7 essentially provide a level of indirection without incurring the overhead of indirection. A "register", as used with respect to these formats, is a shorthand identification of an operand address. A register number is 4 bits wide, and the address to which it refers can be specified as either direct or indirect. The registered 1- or 2-operand format illustrated as format E in FIG. 7, permits specifying up to two operands in registered format, either one of which can be indicated for write-back as well. In particular, bits 3:0 contain a first register number and bits 8:5 contain a second register number. Bit 4 indicates whether the address pointed to by the first register number is to be interpreted as direct or indirect, and bit 9 indicates whether the address pointed to by the second register number is to be interpreted as direct or indirect. Bit 11 of the operand word indicates whether the result is to be written back to the address specified by the first register number, and bit 12 indicates whether the result is to be written back to the address specified by the second register number. Bit 10 indicates whether one or both of the register numbers are valid. An operand word specified in registered 2-operand format is identified by the presence of the code '101' in bits 15:13 of the word.

Operand format F as illustrated in FIG. 7 is a registered 3-operand format. It differs from the registered 1- or 2-operand format in that one additional operand may be specified, but none of the three operand addresses can be indicated for write-back. In the registered 3-operand format, bits 3:0 contain a first register number, bits 8:5 contain a second register number, and bits 13:10 contain a third register number. Bit 4 indicates whether the address pointed to by the first register number is to be considered direct or indirect, bit 9 indicates whether the address pointed to by the second register number is to be considered direct or indirect, and bit 14 indicates whether the address pointed to by the third register number is to be considered direct or indirect. An operand word specified in registered 3-operand format is identifiable by the presence of a '0' in bit 15.

When an operand word in one of the registered formats is loaded into NRC 110 (FIG. 2), the operand load controller 412 causes the multiplexer 126 to select the left-most valid register number into register logic 128. If the operand is in Format E, then the register number at NRC(8:5) is used if it is valid, otherwise the register number at NRC(3:0) is used. If the operand is in Format F, then the register number at NRC(13:10) is used. As explained in more detail below, the register logic 128 converts the selected 4-bit register number to a 10-bit address according to RBASE and RMAP values previously specified by the program. The multiplexer 122 selects the output of register logic 128 onto the RDADDR bus 124, which is supplied to the IRAM 310 and EIRAM 312 (FIG. 5). Any indirection specified in NRC(4) is performed in the manner explained above, and the resulting operand is then loaded into the appropriate double buffer in the buffer/computation subsystem 22 (FIG. 3). If the operand was in Format E, and the write-back bit WB2 or WB1 corresponding to the selected register number is set, then the 10-bit operand address is also written to one of the WRITE registers 324 or 326 as explained above.

If the operand word was in Format E and NRC(10) indicated that only one register number is valid, then there are no more operands to load in response to the present operand word. If NRC(10) indicates that both register numbers are valid, then at this point operand load controller 412 controls multiplexer 126 to select NRC(3:0) into the register logic 128 for translation, the output of which is selected by multiplexer 122 onto the RDADDR bus 124. The second operand is then obtained by direct or indirect addressing in the same manner as the first operand. A write-back address is also written to one of the WRITE registers 324 or 326 in accordance with the WB2 bit in NRC(12). Note that no more than one of the write-back bits can be validly set.

If the word in NRC 110 is in Format F, then the operand load controller 412 obtains the first operand as specified by the register number in NRC(13:10). NRC(13:10) is selected via the third input of multiplexer 126 to the register logic 128, where it is translated and provided to multiplexer 122 which selects it onto the RDADDR bus 124. The operand is then obtained by direct or indirect addressing as explained above. Operand load controller 412 then goes on to obtain the second and third operands in the same manner, selecting respectively NRC(8:5) and NRC(3:0) to register logic 128.

FIG. 9 shows a detail of the register logic 128 (FIG. 2). The 4-bit register number from the output of multiplexer 126 (FIG. 4) enters the register logic 128 on a bus 510, and the 10-bit translated address (direct or indirect) is provided on output bus 512. Bits 0 and 1 of the register number on bus 510 are passed directly to respective bits 0 and 1 of the output bus 512. Bit 2 of the input register number is provided to one input of an XOR gate 514, the other input of which comes from bit 0 of the RBASE register 140. The output of XOR gate 514 forms bit 2 of the output bus 512. Bit 2 of the register number is also provided to an x input of twiddle logic 516, the content of which is explained hereinafter. Bit 3 of the input register number is provided to a y input of twiddle logic 516, the output of which forms bit 8 of the output bus 512. Bit 3 of the input register number is also provided directly as bit 9 of the output bus 512. Bits 5:1 of the RBASE register 140 are provided as bits 7:3, respectively, of the output bus 512, and the 3 bits of the RMAP register 142 are provided to a select (S) port of twiddle logic 516. FIG. 10 indicates, in the first two columns, the logic function performed by twiddle logic 516 in response to the 3-bit select value from RMAP register 142 (d indicates "don't care").

In a single instruction, all the 4-bit register numbers select from a single set of 16 addresses. Some of the addresses in DSP 10 duplicatively address the same physical locations, as previously mentioned. Thus, in the power-up default state of RMAP=0 and RBASE=0, the register address mapping will be as follows:

| Register Number | Resulting Address on Bus 512 | Corresponding Physical Location |
| --- | --- | --- |
| R0–R3 | 000h–003h | 000h–003h (first 4 addresses of EI address range) |
| R4–R11 | 104h–107h 200h–203h | 100h–107h (first 8 addresses of I address range) |
| R12–R15 | 304h–307h | 304h–307h (first 4 addresses of EO address range) |

Accordingly, the default RMAP and RBASE values provide four registers in the external in (EI) address range, eight in the internal (I) address range and four in the external out (EO) address range. The registers can be remapped in several ways to allow better access for programs that need to place different emphasis on the different address ranges. For example, a program which requires heavy coefficient access, less intermediate storage and few output variables might use a register mapping which provides eight registers in the EI address range, four in the I address range and four in the EO address range. The last three columns of FIG. 10 set out the number of addresses within each of the three address ranges for each corresponding value of RMAP. The RMAP value may be set by the program using the RMAP instruction described above.

Bits 7:3 of the address specified by a register number in an operand word are provided by bits 5:1 of ABASE register 140. Essentially the addresses pointed to by register numbers can be thought of as being located in 8-word blocks of addresses, one block in each of the two address ranges, EI and EO, and two blocks in address range I. If RMAP is such that eight of the registers point to addresses in one of the address ranges, then those addresses occupy an entire 8-word block. If the RMAP value places four of the registers in one of the address ranges, then those four registers occupy one or the other half of the block. If the RMAP value places all sixteen registers in a single one of the address ranges, which can occur only in the I address range, then the designated address locations occupy two full blocks in that address range.

The RBASE instruction, described above, can be used by a program to change the value in RBASE in order to shift the 8-word blocks within their respective address ranges. Changing the base value changes the base for all of the registers.

Bit 0 of RBASE register 140 provides yet another level of flexibility in the choice of register mappings. In particular, if RBASE(0) equals 0, then the addresses pointed to by register numbers are at the low end or the high end of their block, depending on RMAP. If RBASE(0)=1, then they are at the opposite end of the block specified by RMAP.

It can be seen that the register mapping provided by register logic 128 affords the flexibility of indirection without the overhead of indirect operand fetching. Also, since two or three register identifications can be included within a single operand word (FIG. 7, formats E and F), the space savings achieved with register addressing can be as high as 3:1. Preferably, an assembler is provided with an "RBANK" pseudoinstruction, which translates automatically into a proper RBASE instruction.

It can be seen that a digital signal processor architecture has been described which contains numerous performance-enhancing features. Each feature alone can improve performance, but in combination the performance is enhanced markedly.

The invention has been described with respect to particular embodiments thereof, and it will be understood that numerous modifications are possible within its scope.

- 49 -

APPENDIX I

FETCH CONTROLLER PSEUDOCODE

©1992 The 3DO Company

```
     #N_Fetcher.var
     # variable definitions for N_Fetcher FSM

#Say which FSM these vars belong to
     owner N_FETCHER
     #Operand Types
     var 3Registers_NF  =  !OPERAND_TYPE.1
     var 2Registers_NF  =  OPERAND_TYPE.1  &  !OPERAND_TYPE.0  &  R_IM  &  NUM_REGS
     #notused
     #var 1Registers_NF =  OPERAND_TYPE.1  &  !OPERAND_TYPE.0  &  R_IM  &  !NUM_REGS

#Determine when the N_FETCHER has to suspend itself.
     #When an indirect operand shows up, the N_FETCHER will still bump the PC and NR on the
     # next tick. The N_FETCHER will then notice that the OPERAND_LOADER is in the INDIRECTION
     # state and it will do nothing on the following tick. This will make it appear as if the
     # N_FETCHER is jumping the gun when indirects come in, but it saves a lot of logic.
     #When a 2 or 3 group register operand comes in, however, the N_FETCHER must notice this and
     # idle the PC and NR so the register addresses remain available to the OPERAND_LOADER.

     var Register_Wait = (3Registers_NF | 2Registers_NF) & !1MORE_REGISTERS_O
     #The 1MORE_REGISTERS_O output from the OPERAND_LOADER lets the N_FETCHER know that there is
     # only 1 register left to decode of the group.

     #ALU Multiplexer decodes
     #notused
     #var Alu_Acc_A  =  !ALU_MUX_A.1  &  !ALU_MUX_A.0
     #var Alu_Acc_B  =  !ALU_MUX_B.1  &  !ALU_MUX_B.0
     var Alu1_A     =  !ALU_MUX_A.1  &   ALU_MUX_A.0
     var Alu1_B     =  !ALU_MUX_B.1  &   ALU_MUX_B.0
     var Alu2_A     =   ALU_MUX_A.1  &  !ALU_MUX_A.0
     var Alu2_B     =   ALU_MUX_B.1  &  !ALU_MUX_B.0
     var Alu_Mult_A =   ALU_MUX_A.1  &   ALU_MUX_A.0
     var Alu_Mult_B =   ALU_MUX_B.1  &   ALU_MUX_B.0
     #notused
     #var Fast_Alu  =  ALU.3  #All logical functions have ALU.3 set
                              #This is also used to determine shift type
     var Transfer  =  !ALU.2 & !ALU.1 & !ALU.0  #Logical or arithmetic transfer
     #Operand Requests (inferred)
     var Use_Mult    =  Alu_Mult_A  |  Alu_Mult_B
     var Mult1_Used  =  Use_Mult
     # Second multiplier operand is used if MULT_SELECT is true (1)
     var Mult2_Used  =  Use_Mult   &  MULT_SELECT
     var Mult1_Rqst  =  Mult1_Used &  !MULT1_MASK
     var Mult2_Rqst  =  Mult2_Used &  !MULT2_MASK
     #notused
     var Mult_Rqsts_Operand = Mult1_Rqst | Mult2_Rqst
     var Alu1_Used   =  Alu1_A  |  Alu1_B
     var Alu2_Used   =  Alu2_A  |  Alu2_B
     var Alu1_Rqst   =  Alu1_Used & !ALU1_MASK
     var Alu2_Rqst   =  Alu2_Used & !ALU2_MASK
     var Alu_Rqsts_Operand  =  Alu1_Rqst | Alu2_Rqst
     #Bit lines for the COMPUTE_WAIT_BUFFER
     #Change these to tweak the DSPP
     var CwbVar3  =  0                          #160ns computation
     var CwbVar2  =  Use_Mult & !Transfer       #120ns computation
     var CwbVar1  =  (Use_Mult ^ !Transfer)     #80ns computation
     var CwbVar0  =  !Use_Mult & Transfer       #40ns computation
```

- 50 -

```
     #Bs_Used means the Barrel Shifter uses an operand instead of an instant
     #  A value of 1000 means use an operand
     #  If the operand equals 1000 itself, something very wonderful happens
     var Bs_Used  =  BS.3  &  !BS.2  &  !BS.1  &  !BS.0
     var Bs_Rqst  =  Bs_Used   &   !BS_MASK   #BS requests Operand

#Determine how many operands are being passed and thus have to be fetched.
     #This depends on the OPERAND_MASK and the setting of the NUM_OPSx bits;
     #  a NUM_OPS value of 00 means zero if the ALU is not passed any operands
     #  Otherwise, a NUM_OPS value of 00 means 4 operands are passed.
     #  Yes, this is weird, it saves a bit in the N-Struction word.
     #This number includes the write operand if there is one.
     #It does not include a Barrel Shifter operand; that is handled independently.

     var 0_Operands_Passed   =   !NUM_OPS.1   &   !NUM_OPS.0   &   !Alu_Rqsts_Operand
     var 1_Operands_Passed   =   !NUM_OPS.1   &    NUM_OPS.0
     var 2_Operands_Passed   =    NUM_OPS.1   &   !NUM_OPS.0
     var 3_Operands_Passed   =    NUM_OPS.1   &    NUM_OPS.0
     var 4_Operands_Passed   =   !NUM_OPS.1   &   !NUM_OPS.0   &    Alu_Rqsts_Operand
     #This variable was added for RED
     #A zero Operand arithmetic N-Struction is currently being fetched -
     #  there are no operands expressed or implied
     var 0Operand_N_Struction_NF   =   (0_Operands_Passed | \
         (1_Operands_Passed & !Mult_Rqsts_Operand & !Alu_Rqsts_Operand))\
         & !Bs_Rqst    & !A_C \
         & (N_FETCHER_state == N_FETCH)

#Note: this variable does NOT count the zeroth bit b/c that operand
     #  is getting fetched at the time the latch is checked
     var No_Operands    =   !(NUMBER_OPERANDS_L.3 | NUMBER_OPERANDS_L.2 |\
              NUMBER_OPERANDS_L.1 | (NUMBER_OPERANDS_L.0 & BS_RQST_L) )
     #Indicates a computation is currently in progress
     var Computing   =  COMPUTE_WAIT_BUF2.3 | \
        COMPUTE_WAIT_BUF2.2 | COMPUTE_WAIT_BUF2.1 | COMPUTE_WAIT_BUF2.0

#Indicates computation in progress that will not be ready within 1 tick (2 hicks)
     #This allows for COMPUTE_WAIT_BUF2.0 to be set.
     #IT IS ESSENTIAL THAT COMPUTE_WAIT_BUF2 IS GUARANTEED TO BE SHIFTED ON THE NEXT HICK/TICK
     #notused
     #var Wait_For_Compute = COMPUTE_WAIT_BUF2.3 |\
     #   COMPUTE_WAIT_BUF2.2 | COMPUTE_WAIT_BUF2.1

#Move needs to wait b/c the write?_L it wants to write to is still full
     #  from 2 ariths ago
     Move_Wait  =  (ARITH_L & DO_WRITE0_L) | (!ARITH_L & DO_WRITE1_L)

#Branch Condition
     #There are 4 modes for branch conditions, a select bit to choose between using N and V,
     #  or C and Z for logic, and two FLAG_MASKs to indicate which status bits are important.
     #  Mode0 is the special mode - all special N-Structions are here.
     #  Mode1 means where there is a set FLAG bit, the corresponding status bit must be a 1
     #  Mode2 means where there is a set FLAG bit, the corresponding status bit must be a 0
     #  Mode3 to be defined.
     var Md0   =   !MODE.1   &   !MODE.0
     var Md1   =   !MODE.1   &    MODE.0
     var Md2   =    MODE.1   &   !MODE.0
     var Md3   =    MODE.1   &    MODE.0
     #This is just a couple of 2-1 MUXes selected by the S bit with inputs N,V,Z,and C
     #Outputs are N and V or Z and C
     var Stat0 =   (FLAG_SELECT & C) | (!FLAG_SELECT & N)
     var Stat1 =   (FLAG_SELECT & Z) | (!FLAG_SELECT & V)
     #The Status bits need to be inverted for Mode2. This is accomplished with an XOR of the
     #  Status bits with Md2
     var New_Stat0    =  Stat0 ^ Md2
     var New_Stat1    =  Stat1 ^ Md2
70
```

- 51 -

```
     var tmp_dcare1  =  !FLAG_MASK.1 |  (FLAG_MASK.1 & New_Stat0)
     var tmp_dcare0  =  !FLAG_MASK.0 |  (FLAG_MASK.0 & New_Stat1)
     var  Really_Dcare =  !FLAG_MASK.1 & !FLAG_MASK.0
     var Md12_Success =  tmp_dcare1   &  tmp_dcare0   & (MODE.1 ^ MODE.0) \
           & !Really_Dcare
     #isn't success if FLAG.MASK bits are both 0 (this is super_dupers)
     #can also use Md1 | Md2 for above - whichever is smaller var Super_Duper_Special = A_C & (MODE.1 ^ MODE.0) & Really_Dcare
     var   Super_Duper0  =  A_C & Md1 & !FLAG_SELECT & Really_Dcare
     var Super_Duper1    =  A_C & Md1 &  FLAG_SELECT & Really_Dcare
     #var Super_Duper2   =  A_C & Md2 & !FLAG_SELECT & Really_Dcare
     #var Super_Duper3   =  A_C & Md2 &  FLAG_SELECT & Really_Dcare
     #Added for REDCHIP
     #All 20 bits of Accume=zero, or not
     var All_Zero = Super_Duper0 & Z & X
     var Not_All_Zero = Super_Duper1 & !(Z & X)
     var Sd_Success   = All_Zero | Not_All_Zero
     #Test (N ^ V) or !(N ^ V)   (XOR or Coincidence)
     #  also can do N^V | Z      (BLE)
     #  or !(N^V) & !Z           (BGT)
     var Nvtest   = ( ((N ^ V) | (Z & FLAG_MASK.0)) ^ FLAG_MASK.1 ) & !FLAG_SELECT

#Test (C & !Z)  or  (!C | Z)
     var Tmp_Cz  =  C & !Z
     var Cztest  =  (Tmp_Cz ^ FLAG_MASK.0) & FLAG_SELECT & !FLAG_MASK.1
     #Test for Xactness (bottom 4 bits of ALU result are zero)
     var Xactest  =  (X ^ FLAG_MASK.0) & FLAG_SELECT & FLAG_MASK.1 var Md3_Success  =  (Nvtest | Cztest | Xactest) & Md3
     var Branch   =  (Md12_Success | Md3_Success | Sd_Success)  &  A_C var Special  =  Md0    &  A_C
     var Super_Special = Special    & (SPECIAL_OP == 0b000)
     var Jump =           Special & (SPECIAL_OP == 0b001)
     var Jsr  =           Special & (SPECIAL_OP == 0b010)
     var Branch_From =    Special & (SPECIAL_OP == 0b011)
     var MoveReg =        Special & (SPECIAL_OP == 0b100)
     #var Not_Used1 =     Special & (SPECIAL_OP == 0b101)
     var Move =           Special & ((SPECIAL_OP == 0b110) |\
                          (SPECIAL_OP == 0b111))

var Nop =            Super_Special & (SUPER_SPECIAL_OP == 0b000)
     var Branch_Accume =  Super_Special & (SUPER_SPECIAL_OP == 0b001)
     var Rbase =          Super_Special & (SUPER_SPECIAL_OP == 0b010)
     var Rmap =           Super_Special & (SUPER_SPECIAL_OP == 0b011)
     var Rts =            Super_Special & (SUPER_SPECIAL_OP == 0b100)
     var Operand_Mask =   Super_Special & (SUPER_SPECIAL_OP == 0b101)
     #var Not_Used2 =     Super_Special & (SUPER_SPECIAL_OP == 0b110)
     var Dspp_Sleep =     Super_Special & (SUPER_SPECIAL_OP == 0b111)

owner

     #N_FETCHER
     #Donald Gray fsm N_FETCHER
     #need to clear the tlatch fudge
     unset OP_RDY_S_NF if Dspp_Reset
         goto N_FETCH
```

- 52 -

```
        else
            switch
                case N_FETCHER_state == N_FETCH
                    if !GWILLING       #External calls for suspension
                        #FSM outputs must be propagated
                        if JUST_BRANCHED_O
                            output JUST_BRANCHED_O
                        endif
                        if SLEEP_O
                            output SLEEP_O
                        endif
                        goto N_FETCH
                    else if JUST_RESET_O
                        #just had a Dspp_Reset, bump the PC and NR
                        #  and start 'er up!
                        latch NR = NStruct[PC]
                        latch PC = PC +1
                        goto N_FETCH
                    else

#CONTROL WORD
                        #   All the signals below are
                        #   ANDed with A_C and checked for "Special"
                        switch
                        case Nop
                            latch NR = NStruct[PC]
                            latch PC = PC +1
                            goto N_FETCH
                        case Branch
                            if JUST_BRANCHED_O  #Previous N-Struction resulted in successful
                                                #  branch. So skip this branch.
                                latch NR = NStruct[PC]
                                latch PC = PC + 1
                                goto N_FETCH
                            else if Computing
                                #If the Cruncher is still crunching, and will not be ready in 1 tick,
                                #  need to wait until it is done so status
                                #  bits are valid
                                #The status bits are latched at the same time the
                                #COMPUTE_WAIT_BUF2 is latched to 0
                                goto N_FETCH
                            else
                                latch NR = NStruct[PC]
                                latch PC = BCH_ADDRESS
                                output JUST_BRANCHED_O    #Lets next N-Struction know there
                                                          #was a successful branch.
                                goto N_FETCH
                            endif
                        case Branch_Accume
                            #Branch to location stored in ACCUME
                            if JUST_BRANCHED_O  #Previous N-Struction resulted in successful
                                                #  branch. So skip this branch.
                                latch NR = NStruct[PC]
                                latch PC = PC + 1
                                goto N_FETCH
                            else if Computing
                                #If the Cruncher is still crunching, and will not be ready in 1 tick,
                                #  need to wait until it is done so ACCUME is valid
                                goto N_FETCH
                            else
                                latch NR = NStruct[PC]
                                latch PC = ACCUME10
                                output JUST_BRANCHED_O    #Lets next N-Struction know there
                                                          #was a successful branch.
                                goto N_FETCH
                            endif 70                      case Jump | Jsr
```

- 53 -

```
              if JUST_BRANCHED_O  #Previous N-Struction resulted in successful
                               # branch.  So skip this branch.
                 latch NR = NStruct[PC]
                 latch PC = PC + 1
                 goto N_FETCH
              else
                 if Jsr
                    latch SUBR_L = PC
                 endif
                 latch NR = NStruct[PC]
                 latch PC = BCH_ADDRESS
                 output JUST_BRANCHED_O    #Lets next N-Struction know there
                                           #was a successful branch.
                 goto N_FETCH
              endif
           case Rts
              #why doesn't this look at JUST_BRANCHED_O?
              # I remember thinking about it, but I forget
              # why I did it this way
              latch NR = NStruct[PC]
              latch PC = SUBR_L
              output JUST_BRANCHED_O
              goto N_FETCH
           case Branch_From
              if JUST_BRANCHED_O #Previous N-Struction resulted in successful
                              # branch, so do the branch from
                 latch NR = NStruct[PC]
                 latch PC = BCH_ADDRESS
                 output JUST_BRANCHED_O
                 goto N_FETCH
              else
                 latch NR = NStruct[PC]
                 latch PC = PC +1
                 goto N_FETCH
              endif case Move | MoveReg
              if JUST_BRANCHED_O
                 #Branch in progress, do not execute move
                 latch NR = NStruct[PC]
                 latch PC = PC +1
                 goto N_FETCH
              else if Move_Wait | (OPERAND_LOADER_state == INDIRECTION)
                 #The WRITE?_L is busy,
                 # OR the OPERAND_LOADER is in the process of indirection
                 # we cannot do an indirect fetch of an operand at the same
                 # time as a move b/c if the move is indirect, there is
                 # a mem conflict
                 goto N_FETCH
              else    #Do the move or movereg
                 #all bus and latch manipulations are handled by the
                 #OPERAND_LOADER
                 latch NR = NStruct[PC]
                 latch PC = PC +1
                 goto OPERAND_FETCH
              endif
           case Rbase
              latch RBASE_L = RBASE_VAL
              latch NR = NStruct[PC]
              latch PC = PC +1
              goto N_FETCH
           case Rmap
              latch RMAP_L = RMAP_VAL
              latch NR = NStruct[PC]
              latch PC = PC +1
              goto N_FETCH
           case Operand_Mask
              latch OPERAND_MASK_L = OPERAND_MASK_VAL
              latch NR = NStruct[PC]
              latch PC = PC +1
```

- 54 -

```
            goto N_FETCH
        case Dspp_Sleep
            #When sleep command is issued, DSPP will hang until
            #Dspp_Reset (including DSPP_CLK underflow)
            #This will be useful for performance tests
            #  (ex: how long did the DSPP sleep before it was reset).
            if JUST_BRANCHED_O  #Previous N-Struction resulted in successful
                                # branch.  So skip this.
                latch NR = NStruct[PC]
                latch PC = PC + 1
                goto N_FETCH
            else
                output SLEEP_O
                goto N_FETCH
            endif

#ARITHMETIC WORD
        case !A_C #Need to fetch operands
            if JUST_BRANCHED_O
                #Previous N-Struction resulted in successful
                # branch.  So skip this one.
                latch NR = NStruct[PC]
                latch PC = PC +1
                goto N_FETCH
            else if OPERANDS_READY_L | OPERAND_LOADER_state == INDIRECTION
                #There are still valid operands in the BUF1's
                #  or an operand is being indirected
                #Cannot load any new operands.
                goto N_FETCH
            else
                if Mult1_Rqst
                    set MULT1_RQST_L
                endif
                if Mult2_Rqst
                    set MULT2_RQST_L
                endif
                if Alu1_Rqst
                    set ALU1_RQST_L
                endif
                if Alu2_Rqst
                    set ALU2_RQST_L
                endif
                if Bs_Rqst
                    set BS_RQST_L
                endif

#These latches are linked to form a simple shift register
                latch NUMBER_OPERANDS_L.3 =  4_Operands_Passed
                latch NUMBER_OPERANDS_L.2 =  3_Operands_Passed
                latch NUMBER_OPERANDS_L.1 =  2_Operands_Passed
                latch NUMBER_OPERANDS_L.0 =  1_Operands_Passed

#COMPUTE_WAIT_BUF sets the amount of time the Cruncher
                #  waits for the computation to complete.
                #  The resolution of this shift reg is 20ns
                #  The time waited will be 40ns * (#bits set)
                #These bits are now calculated in N_Fetcher.var
                latch COMPUTE_WAIT_BUF1.3 = CwbVar3
                latch COMPUTE_WAIT_BUF1.2 = CwbVar2
                latch COMPUTE_WAIT_BUF1.1 = CwbVar1
                latch COMPUTE_WAIT_BUF1.0 = CwbVar0

#Added to RED to fix bug #2 (long arith followed
                # by 0op. arith)
                if 0Operand_N_Struction_NF
                    set OP_RDY_S_NF
                endif if 0_Operands_Passed & !Bs_Rqst
                    # No operands need to be fetched
```

```
                            latch NR = NStruct[PC]
                            latch PC = PC +1
                            goto N_FETCH
                        else   #get operands
                            latch NR = NStruct[PC]
                            latch PC = PC +1
                            goto OPERAND_FETCH
                        endif
                    endif
                default
                    #This should be a failed branch
                    #Any unspecified N-Struction will fall into this crack.
                    #Make sure we are not in the middle of a computation
                    # b/c need to wait until status bits are valid
                    if !Computing
                        latch NR = NStruct[PC]
                        latch PC = PC +1
                    endif
                    goto N_FETCH endswitch
            endif case N_FETCHER_state == OPERAND_FETCH
                if !GWILLING | Register_Wait
                    #External call for suspension, or
                    #Multiple registers are being fetched
                    #FSM outputs must be propagated
                    if JUST_BRANCHED_O
                        output JUST_BRANCHED_O
                    endif
                    if SLEEP_O
                        output SLEEP_O
                    endif
                    goto OPERAND_FETCH       # the OPERAND_LOADER is dealing with a
                                             # register group, so pause.
                else
                    if No_Operands  #Done fetching operands (last one
                                    # is being fetched now).
                        latch NR = NStruct[PC]
                        latch PC = PC +1
                        goto N_FETCH
                    else
                        if OPERAND_LOADER_state == INDIRECTION
                            #Indirection in progress.  Wait 1 tick
                            #The next operand will be in the NR but it will not be loaded for a tick
                            goto OPERAND_FETCH
                        else
                            #The operand counter NUMBER_OPERANDS_L
                            # is shifted by the Operand_Loader
                            latch NR = NStruct[PC]
                            latch PC = PC +1
                            goto OPERAND_FETCH
                        endif
                    endif
                endif
            endswitch endif
    end
```

- 56 -

APPENDIX II

OPERAND LOAD CONTROLLER PSEUDOCODE

©1992 The 3DO Company

```
     #Operand_Loader.var define variables for Operand_Loader.FSM

Say which FSM these vars belong to
     owner OPERAND_LOADER

#Operand Types
     var Immediate_OL    = OPERAND_TYPE.1  &  OPERAND_TYPE.0
     var Addressed_OL    = OPERAND_TYPE.1  &  !OPERAND_TYPE.0 & !R_IM
     var Direct_OL       = Addressed_OL    & !D_I
     var Indirect_OL     = Addressed_OL    &  D_I
     var 3Registers_OL   = !OPERAND_TYPE.1
     var 2Registers_OL   = OPERAND_TYPE.1  &  !OPERAND_TYPE.0 & R_IM  & NUM_REGS
     var 1Registers_OL   = OPERAND_TYPE.1  &  !OPERAND_TYPE.0 & R_IM  & !NUM_REGS
     #Barrel Shifter uses an "instant" operand
     var Bs_Used_OL      = BS.3  &  !BS.2 &  !BS.1 &  !BS.0
     var Bs_Instant_Rqst = !Bs_Used_OL  &  !BS_MASK  #BS requests instant
     var Any_Operand_Rqsts = MULT1_RQST_L | MULT2_RQST_L       |\
         ALU1_RQST_L   | ALU2_RQST_L   | BS_RQST_L

#The Specialy Designed "Exactly-One" Gate.
     #On Its First World Tour ----
     var tmp_xor1     =  MULT1_RQST_L ^ MULT2_RQST_L
     var tmp_xor2     =  ALU1_RQST_L ^ ALU2_RQST_L
     var tmp_xor3     =  tmp_xor1 ^ tmp_xor2
     var xor          =  tmp_xor3 ^ BS_RQST_L
     var tmp_nand1    =  MULT1_RQST_L !& MULT2_RQST_L
     var tmp_nand2    =  ALU1_RQST_L !& ALU2_RQST_L
     var tmp_nand3    =  tmp_xor1 !& tmp_xor2
     var tmp_nand4    =  tmp_xor3 !& BS_RQST_L
     var Exactly_1Rqst = xor & tmp_nand1 & tmp_nand2 & tmp_nand3 & tmp_nand4

     #Note: Any_Operands and No_Operands are not inversely related
     var Any_Operands   = NUMBER_OPERANDS_L.3 |\
         NUMBER_OPERANDS_L.2 | NUMBER_OPERANDS_L.1 | NUMBER_OPERANDS_L.0 var Special_OL  = A_C & !MODE.1    &  !MODE.0
     var MoveReg_OL =       Special_OL & (SPECIAL_OP == 0b100)
     var Move_OL =          Special_OL & ((SPECIAL_OP == 0b110) |\
                            (SPECIAL_OP == 0b111))
     #Move needs to wait b/c the write?_L it wants to write to is still full
     # from 2 ariths ago
     Move_Wait_OL = (ARITH_L & DO_WRITE0_L) | (!ARITH_L & DO_WRITE1_L)

#Indicates a computation is currently in progress
     #var Computing_OL  = COMPUTE_WAIT_BUF2.3 | \
     #   COMPUTE_WAIT_BUF2.2 | COMPUTE_WAIT_BUF2.1 | COMPUTE_WAIT_BUF2.0
     #Indicates computation in progress that will not be ready within 1 tick (2 hicks)
     #This allows for COMPUTE_WAIT_BUF2.0 to be set.
     #IT IS ESSENTIAL THAT COMPUTE_WAIT_BUF2 IS GUARANTEED TO BE SHIFTED ON THE NEXT HICK/TICK
     #notused:
     #var Wait_For_Compute_OL = COMPUTE_WAIT_BUF2.3  |\
     #   COMPUTE_WAIT_BUF2.2 | COMPUTE_WAIT_BUF2.1 owner

     #Operand_Loader
     #Donald Gray
```

- 57 -

```
        temp tmpx 1
        end
        temp tmpy 1
        end
        temp Twiddle_Bit 1
        end
        temp ANYREGU 1
        end
   macro HIGH_PRIORITY
           if MULT1_RQST_L
              latch MULT1_BUF1 = OPERAND_BUS
              unset MULT1_RQST_L
              shift NUMBER_OPERANDS_L
           else if MULT2_RQST_L
              latch MULT2_BUF1 = OPERAND_BUS
              unset MULT2_RQST_L
              shift NUMBER_OPERANDS_L
           else if ALU1_RQST_L
              latch ALU1_BUF1 = OPERAND_BUS
              unset ALU1_RQST_L
              shift NUMBER_OPERANDS_L
           else if ALU2_RQST_L
              latch ALU2_BUF1 = OPERAND_BUS
              unset ALU2_RQST_L
              shift NUMBER_OPERANDS_L
           else if BS_RQST_L
              latch BS_SELECT_BUF1 = BS_SELECT_DATA
              latch BS_TYPE_BUF1 = BS_TYPE_DATA
              #Can specify shift type (arith or logical) in operand
              #  this latches in 5 bits: 4 for shift and 1 for type
              unset BS_RQST_L
              #Do not shift NUMBER_OPERANDS_L b/c the BS operand is not included.
              # in NUMBER_OPERANDS_L variable
           else
              output ERROR_0
              debug High_Priority has been called, but there is no request
           endif if Exactly_1Rqst
              #This is the last operand so set latch indicating operands are ready
              #The Cruncher uses this latch to know it may begin computation
              #MAKE SURE THIS LATCH CAN BE SET AND UNSET @ THE SAME TIME
              #  resulting in the latch being unset
              set OP_RDY_S_OP
           endif
        endmacro HIGH_PRIORITY
        macro WRITE
           #put the write address in WRITOE_L or WRITE1_L
           #depending on the pipeline
           if ARITH_L
              set DO_WRITE1_L
              latch WRITE1_L = WRITE_L_BUS
           else
              set DO_WRITE0_L
              latch WRITE0_L = WRITE_L_BUS
           endif
        endmacro WRITE fsm OPERAND_LOADER
        #need to clear the tlatch fudge
        unset OP_RDY_S_OP

#Hand optimized logic for the REG_BUS:
        #Register Addressing:
```

- 58 -

```
     # The logic for register address calculations corresponds to the logic below
     # that is used for FSM ouputs
     switch
         #The following logic is implemented by hand for speed
         case (!NR.15 & !2MORE_REGISTERS_O & !1MORE_REGISTERS_O)
             calc REG_BUS = R3
         case ((NR.15 & NUM_REGS & !1MORE_REGISTERS_O) | 2MORE_REGISTERS_O)
             calc REG_BUS = R2
         case ((NR.15 & !NUM_REGS) | 1MORE_REGISTERS_O)
             calc REG_BUS = R1
     endswitch

#Determine Twiddle based on register mapping
     #  automatically done in the hardware
     calc tmpx = REG_BUS.2
     calc tmpy = REG_BUS.3    #  Reg Stack Mapping
     switch
         case RMAP_L == 0b000        #  E1    1      E0
             calc Twiddle_Bit = tmpx #  4     8       4
         case RMAP_L == 0b001
             calc Twiddle_Bit = tmpx #  4     8       4
         case RMAP_L == 0b010
             calc Twiddle_Bit = tmpx #  4     8       4
         case RMAP_L == 0b011
             calc Twiddle_Bit = tmpx #  4     8       4
         case RMAP_L == 0b100
             calc Twiddle_Bit = tmpy #  8     0       8
         case RMAP_L == 0b101
             calc Twiddle_Bit = !tmpy #  0   16       0
         case RMAP_L == 0b110
             calc Twiddle_Bit = tmpx & tmpy # 8    4        4
         case RMAP_L == 0b111
             calc Twiddle_Bit = tmpx | tmpy # 4    4        8
     endswitch
     #In the hardware, the REG_ADDRESS_BUS is actually:
     #  RBUSU3,TWID,RBASELC[5:1],LAND,RBUSU[1:0]
     calc REG_ADDRESS_BUS.0 = REG_BUS.0
     calc REG_ADDRESS_BUS.1 = REG_BUS.1
     calc REG_ADDRESS_BUS.2 = REG_BUS.2 ^ RBASE_L.0
     calc REG_ADDRESS_BUS.3 = RBASE_L.1
     calc REG_ADDRESS_BUS.4 = RBASE_L.2
     calc REG_ADDRESS_BUS.5 = RBASE_L.3
     calc REG_ADDRESS_BUS.6 = RBASE_L.4
     calc REG_ADDRESS_BUS.7 = RBASE_L.5
     calc REG_ADDRESS_BUS.8 = Twiddle_Bit
     calc REG_ADDRESS_BUS.9 = REG_BUS.3

     #Hand optimized ADDRESS_BUS multiplexing:
     #  All calcs for the ADDRESS_BUS are left in the code for comprehension
     #  but they are commented out.
     calc ANYREGU = ( !NR.15 | (NR.15 & !NR.14 & !NR.13) )
     switch
         case ( !(OPERAND_LOADER_state==INDIRECTION) & \      #get non-reg
                ( (N_FETCHER_state==N_FETCH & !NR.11) | \     #movereg
                  (!(N_FETCHER_state==N_FETCH) & ANYREGU) ) ) #register operand
             calc ADDRESS_BUS = REG_ADDRESS_BUS
         case ( !(OPERAND_LOADER_state==INDIRECTION) & \      #get reg
                ( (N_FETCHER_state==N_FETCH & NR.11) | \      #move
                  (!(N_FETCHER_state==N_FETCH) & !ANYREGU) ) ) #non-register operand
             calc ADDRESS_BUS = OP_ADDRESS
         case ( OPERAND_LOADER_state==INDIRECTION ) #we are in INDIRECT
             calc ADDRESS_BUS = INDIRECT_L
     endswitch

#The DATA_BUS is directly connected to mem in Si
     #  references to it within the code are kept for clarity.
```

- 59 -

```
        calc DATA_BUS = DATA[ADDRESS_BUS]

#Hand optimized OPERAND_BUS multiplexing:
        #  All calcs for the OPERAND_BUS are left in the code for comprehension
        #  but they are commented out.
        switch
            case ( (OPERAND_LOADER_state==LOAD) & NR.15 & NR.14 )
                calc OPERAND_BUS = just_func function (JUSTIFY, IMMEDIATE_VAL)
            case ( !( (OPERAND_LOADER_state==LOAD) & NR.15 & NR.14 ) )
                calc OPERAND_BUS = DATA_BUS
        endswitch if Dspp_Reset
            goto LOAD
        else
            switch
                case OPERAND_LOADER_state == LOAD
                    if !GWILLING
                        #External calls for halt or first set of operand BUFs is full
                        # so stall
                        #FSM must propagate its outputs
                        if ERROR_O
                            output ERROR_O
                        endif
                        if MOVE_O
                            output MOVE_O
                        endif
                        if WR_MOVE_O
30                          output WR_MOVE_O
                        endif
                        if 3MORE_REGISTERS_O
                            output 3MORE_REGISTERS_O
                        endif
35                      if 2MORE_REGISTERS_O
                            output 2MORE_REGISTERS_O
                        endif
                        if 1MORE_REGISTERS_O
                            output 1MORE_REGISTERS_O
40                      endif
                        if READ_O
                            output READ_O
                        endif
                        goto LOAD
                    else if JUST_RESET_O
                        goto LOAD
                    else
                        switch   #this is an arithmetic opcode, a MOVE opcode,
                                 #  a MOVE operand, a regular operand, or nothing case N_FETCHER_state == N_FETCH
                                if !A_C
                                    #This is an arithmetic, so load in selections
                                    if JUST_BRANCHED_O | OPERANDS_READY_L
                                        #Previous N-Struction resulted in successful
                                        # branch. So skip this one.
                                        # OR, There are still valid operands in the BUF1's
                                        #  or an operand is being indirected
                                        #Cannot load any new operands.
                                    else
                                        latch MULT_SELECT_BUF1 = MULT_SELECT
                                        latch ALU_MUX_A_BUF1 = ALU_MUX_A
                                        latch ALU_MUX_B_BUF1 = ALU_MUX_B
                                        latch ALU_SELECT_BUF1 = ALU
                                        if Bs_Instant_Rqst
                                            #Barrel Shifter does not use operand
                                            # and does not reuse old value.
```

- 60 -

```
                    latch BS_TYPE_BUF1 = ALU.3 #Shift type depends on ALU operation
                    latch BS_SELECT_BUF1 = BS
                endif
                #The ARITH_L indicates whether we are processing
                # a "0" or "1" arithmetic so writes know which they belong to
                if ARITH_L
                    unset ARITH_L
                else
                    set ARITH_L
                endif
            endif else if (Move_OL | MoveReg_OL)
            #This is the opcode for a Move N-Struction
            if JUST_BRANCHED_O | Move_Wait_OL
                #In the middle of a branch, or there is a write pending
                # so stall
            else #Do the move or movereg
                #The ARITH_L indicates whether we are processing
                # a "0" or "1" arithmetic
                # so writes know which they belong to
                #MOVEs also use this latch so their writes
                # can go into the available WRITE latch if Move_OL
                    #calc ADDRESS_BUS = OP_ADDRESS
                else #this is a MoveReg
                    #calc ADDRESS_BUS = REG_ADDRESS_BUS
                endif determine if move is direct or indirect
                if (Move_OL & !D_I) | (MoveReg_OL & !R1_D_I)
                    #Direct Move
                    calc WRITE_L_BUS = ADDRESS_BUS
                else
                    #Indirect Move
                    #calc DATA_BUS = DATA[ADDRESS_BUS]
                    output READ_O
                    calc WRITE_L_BUS = DATA_BUS
                endif if ARITH_L
                #MOVE writes are latched to the opposite
                # write_L as indicated by the ARITH_L
                    latch WRITE0_L = WRITE_L_BUS
                else
                    latch WRITE1_L = WRITE_L_BUS
                endif output MOVE_O
            endif else
            #This must be a control word that is not a MOVE
            #Do nothing
        endif
        goto LOAD case MOVE_O
        switch
        case Immediate_OL
            #calc OPERAND_BUS = just_func function (JUSTIFY, IMMEDIATE_VAL)
            latch MOVE_L = OPERAND_BUS
            output WR_MOVE_O
            goto LOAD
        case Direct_OL
            #calc ADDRESS_BUS = OP_ADDRESS
            #calc DATA_BUS = DATA[ADDRESS_BUS]
            output READ_O
            #calc OPERAND_BUS = DATA_BUS
```

- 61 -

```
              latch MOVE_L = OPERAND_BUS
              output WR_MOVE_O
              goto LOAD
           case Indirect_OL
              #calc ADDRESS_BUS = OP_ADDRESS
              #calc DATA_BUS = DATA[ADDRESS_BUS]
              output READ_O
              latch INDIRECT_L = DATA_BUS
              output MOVE_O
              goto INDIRECTION
           case 1Registers_OL
              #REG_ADDRESS_BUS is precalculated
              #calc ADDRESS_BUS = REG_ADDRESS_BUS
              if !R1_D_I
                 #Register 1 is Direct
                 #calc DATA_BUS = DATA[ADDRESS_BUS]
                 output READ_O
                 #calc OPERAND_BUS = DATA_BUS
                 latch MOVE_L = OPERAND_BUS
                 output WR_MOVE_O
                 goto LOAD
              else
                 #Register 1 is Indirect
                 #calc DATA_BUS = DATA[ADDRESS_BUS]
                 output READ_O
                 latch INDIRECT_L = DATA_BUS
                 output MOVE_O
                 goto INDIRECTION
              endif
           default
              debug ERROR: MOVE from operand is undefined
           endswitch case Any_Operand_Rqsts | Any_Operands
         #There are operands to be fetched
         switch
         case Immediate_OL
            #Justify the immediate. 0 means right justify, 1 means left
            # Right justification has left 3 bits sign extended
            # Left justification has right 3 bits zero filled
            #calc OPERAND_BUS = just_func function (JUSTIFY, IMMEDIATE_VAL)
            $HIGH_PRIORITY
            goto LOAD
         case Direct_OL
            #calc ADDRESS_BUS = OP_ADDRESS
            if Any_Operand_Rqsts
               #calc DATA_BUS = DATA[ADDRESS_BUS]
               output READ_O
               #calc OPERAND_BUS = DATA_BUS
               $HIGH_PRIORITY
               if WRITE_BACK1
                  #Use this operand for write-back
                  calc WRITE_L_BUS = ADDRESS_BUS
                  $WRITE
               endif
            else
               #There are no devices requesting operands,
               # but there is an operand left, so this is a write address.
               calc WRITE_L_BUS = ADDRESS_BUS
               $WRITE
               shift NUMBER_OPERANDS_L
            endif
            goto LOAD case Indirect_OL
            #calc ADDRESS_BUS = OP_ADDRESS
            if Any_Operand_Rqsts
               #calc DATA_BUS = DATA[ADDRESS_BUS]
               output READ_O
               latch INDIRECT_L = DATA_BUS
```

- 62 -

```
        if WRITE_BACK1
            #Operand is used for write back
            output READ_O
            calc WRITE_L_BUS = DATA_BUS
            $WRITE
        endif
        goto INDIRECTION
    else
        #There are no requests, so this is write operand
        #calc DATA_BUS = DATA[ADDRESS_BUS]
        output READ_O
        calc WRITE_L_BUS = DATA_BUS
        $WRITE
        shift NUMBER_OPERANDS_L
        goto LOAD
    endif case 3Registers_OL & !2MORE_REGISTERS_O & !1MORE_REGISTERS_O
    #REG_ADDRESS_BUS is precalculated
    #calc ADDRESS_BUS = REG_ADDRESS_BUS
    #Cannot use reg 3 for write back
    if IR3_D_I
        #Register 3 is Direct
        #calc DATA_BUS = DATA[ADDRESS_BUS]
        output READ_O
        #calc OPERAND_BUS = DATA_BUS
        $HIGH_PRIORITY
        output 2MORE_REGISTERS_O
        goto LOAD
    else
        #Register 3 is Indirect
        output 3MORE_REGISTERS_O
        #calc DATA_BUS = DATA[ADDRESS_BUS]
        output READ_O
        latch INDIRECT_L = DATA_BUS
        goto INDIRECTION
    endif case (2Registers_OL | 2MORE_REGISTERS_O) & !1MORE_REGISTERS_O
    #REG_ADDRESS_BUS is precalculated
    #calc ADDRESS_BUS = REG_ADDRESS_BUS
    if IR2_D_I
        #Register 2 is Direct
        #calc DATA_BUS = DATA[ADDRESS_BUS]
        output READ_O
        #calc OPERAND_BUS = DATA_BUS
        $HIGH_PRIORITY
        if WRITE_BACK2 & !3Registers_OL
            calc WRITE_L_BUS = ADDRESS_BUS
            $WRITE
        endif
        output 1MORE_REGISTERS_O
        goto LOAD
    else
        #Register 2 is Indirect
        #calc DATA_BUS = DATA[ADDRESS_BUS]
        output READ_O
        latch INDIRECT_L = DATA_BUS
        if WRITE_BACK2 & !3Registers_OL
            calc WRITE_L_BUS = DATA_BUS
            $WRITE
        endif
        output 2MORE_REGISTERS_O
        goto INDIRECTION
    endif
case 1Registers_OL | 1MORE_REGISTERS_O
    #REG_ADDRESS_BUS is precalculated
    #calc ADDRESS_BUS = REG_ADDRESS_BUS
    if IR1_D_I
        #Register 1 is Direct
```

- 63 -

```
                    if Any_Operand_Rqsts
                        #This register operand goes to a device.
                        #calc DATA_BUS = DATA[ADDRESS_BUS]
                        output READ_O
                        #calc OPERAND_BUS = DATA_BUS
                        $HIGH_PRIORITY
                        if WRITE_BACK1 & !3Registers_OL
                            calc WRITE_L_BUS = ADDRESS_BUS
                            $WRITE
                        endif
                    else
                        #There are no devices requesting operands, but there
                        # is an operand left, so this is a write address.
                        calc WRITE_L_BUS = ADDRESS_BUS
                        $WRITE
                        shift NUMBER_OPERANDS_L
                    endif
                    goto LOAD
                else
                    #Register 1 is Indirect
                    if Any_Operand_Rqsts
                        #calc DATA_BUS = DATA[ADDRESS_BUS]
                        output READ_O
                        latch INDIRECT_L = DATA_BUS
                        if WRITE_BACK1 & !3Registers_OL
                            #Operand is used for write back
                            calc WRITE_L_BUS = DATA_BUS
                            $WRITE
                        endif
                        goto INDIRECTION
                    else
                        #There are no requests, so this is write operand
                        #calc DATA_BUS = DATA[ADDRESS_BUS]
                        output READ_O
                        calc WRITE_L_BUS = DATA_BUS
                        $WRITE
                        shift NUMBER_OPERANDS_L
                        goto LOAD
                    endif
                endif
            endswitch
        default
            #There are no operands to fetch
            #Nothing to do
            if OPERANDS_READY_L
                debug ERROR: OPERANDS_READY_L is set and there are no operands
            endif
            goto LOAD
        endswitch
    endif case OPERAND_LOADER_state == INDIRECTION
        if !GWILLING #External stop command
            #FSM must propagate its outputs
            if ERROR_O
                output ERROR_O
            endif
            if MOVE_O
                output MOVE_O
            endif
            if WR_MOVE_O
                output WR_MOVE_O
            endif
            if 3MORE_REGISTERS_O
                output 3MORE_REGISTERS_O
            endif
            if 2MORE_REGISTERS_O
                output 2MORE_REGISTERS_O
            endif
            if 1MORE_REGISTERS_O
```

- 64 -

```
                    output 1MORE_REGISTERS_O
                 endif
                 if READ_O
                    output READ_O
                 endif goto INDIRECTION else
                 #calc ADDRESS_BUS = INDIRECT_L
                 #calc DATA_BUS = DATA[ADDRESS_BUS]
                 output READ_O
                 #calc OPERAND_BUS = DATA_BUS if MOVE_O
                    #latch the move operand and tell the cruncher to write it
                    latch MOVE_L = OPERAND_BUS
                    output WR_MOVE_O
                 else
                    $HIGH_PRIORITY
                 endif if 3MORE_REGISTERS_O
                    #need to propagate register count
                    output 2MORE_REGISTERS_O
                 endif
                 if 2MORE_REGISTERS_O
                    #need to propagate register count
                    output 1MORE_REGISTERS_O
                 endif
                 goto LOAD
              endif
       endswitch endif end
```

- 65 -

APPENDIX III

COMPUTATION CONTROLLER PSEUDOCODE

©1992 The 3DO Company

```
      #Cruncher.var define variables for Cruncher FSM

Say which FSM these vars belong to
      owner CRUNCHER

#Operand Types
      var Addressed_CR    = OPERAND_TYPE.1  &  !OPERAND_TYPE.0  &  !R_IM
      var Indirect_CR     = Addressed_CR  &   D_I
      var 3Registers_CR   = !OPERAND_TYPE.1
      var 2Registers_CR   = OPERAND_TYPE.1  &  !OPERAND_TYPE.0  &  R_IM  &  NUM_REGS
      var 1Registers_CR   = OPERAND_TYPE.1  &  !OPERAND_TYPE.0  &  R_IM  &  !NUM_REGS move from operand is indirect
      #not used
      #var Move_Indirect   = Indirect_CR | (1Registers_CR & R1_D_I)

#Any indirect operand- register or addressed
      var Any_Indirect_CR =  Indirect_CR  |  \
          (3Registers_CR & R3_D_I & !2MORE_REGISTERS_O & !1MORE_REGISTERS_O) |\
          ((2Registers_CR | 2MORE_REGISTERS_O) & R2_D_I & !1MORE_REGISTERS_O) |\
          ((1Registers_CR | 1MORE_REGISTERS_O) & R1_D_I)

#The Specialy Designed "Exactly-One" Gate.
      #On Its First World Tour ----
      var tmp_xor1_CR  = MULT1_RQST_L ^ MULT2_RQST_L
      var tmp_xor2_CR  = ALU1_RQST_L ^ ALU2_RQST_L
      var tmp_xor3_CR  = tmp_xor1_CR ^ tmp_xor2_CR
      var xor_CR       = tmp_xor3_CR ^ BS_RQST_L
      var tmp_nand1_CR = MULT1_RQST_L !& MULT2_RQST_L
      var tmp_nand2_CR = ALU1_RQST_L !& ALU2_RQST_L
      var tmp_nand3_CR = tmp_xor1_CR !& tmp_xor2_CR
      var tmp_nand4_CR = tmp_xor3_CR !& BS_RQST_L
      var Exactly_1Rqst_CR = xor_CR & tmp_nand1_CR & tmp_nand2_CR & tmp_nand3_CR & tmp_nand4_CR
      #notused
      #var Computing_CR  = COMPUTE_WAIT_BUF2.3 | \
      #   COMPUTE_WAIT_BUF2.2 | COMPUTE_WAIT_BUF2.1 | COMPUTE_WAIT_BUF2.0
      #Indicates computation in progress that will not be ready within 1 tick (2 hicks)
      #This allows for COMPUTE_WAIT_BUF2.0 to be set.
      #IT IS ESSENTIAL THAT COMPUTE_WAIT_BUF2 IS GUARANTEED TO BE SHIFTED ON THE NEXT HICK/TICK
      #notused
      #var Wait_For_Compute_CR = COMPUTE_WAIT_BUF2.3 |\
      #   COMPUTE_WAIT_BUF2.2 | COMPUTE_WAIT_BUF2.1

#*****************************************************************
      #Everything below is duplicated logic for the sole purpose of producing
      #   the 0Operand_N_Struction variable.
      #   This is used by the cruncher to determine that an instruction with
      #   no computation operands has just arrived.
      #   If this logic is too big, the N_Fetcher will have to inform the Cruncher
      #   that such an instruction has arrived. (by setting the OPERANDS_READY latch?)
      #   This will add 1/2 or 1 tick to any computation that has no operand except
      #   a write operand.

#ALU Multiplexer decodes
      var Alu1_A_CR  = !ALU_MUX_A.1 & ALU_MUX_A.0
      var Alu1_B_CR  = !ALU_MUX_B.1 & ALU_MUX_B.0
      var Alu2_A_CR  = ALU_MUX_A.1  & !ALU_MUX_A.0
      var Alu2_B_CR  = ALU_MUX_B.1  & !ALU_MUX_B.0
```

- 66 -

```
        var Alu_Mult_A_CR    =  ALU_MUX_A.1      &  ALU_MUX_A.0
        var Alu_Mult_B_CR    =  ALU_MUX_B.1      &  ALU_MUX_B.0

#Operand Requests (inferred)
        var Use_Mult_CR      =  Alu_Mult_A_CR    |  Alu_Mult_B_CR
        var Mult1_Used_CR    =  Use_Mult_CR
        # Second multiplier operand is used if MULT_SELECT is true (1)
        var Mult2_Used_CR    =  Use_Mult_CR      &  MULT_SELECT
        var Mult1_Rqst_CR    =  Mult1_Used_CR    &  !MULT1_MASK
        var Mult2_Rqst_CR    =  Mult2_Used_CR    &  !MULT2_MASK
        var Mult_Rqsts_Operand_CR  =  Mult1_Rqst_CR  |  Mult2_Rqst_CR
        var Alu1_Used_CR     =  Alu1_A_CR  |  Alu1_B_CR
        var Alu2_Used_CR     =  Alu2_A_CR  |  Alu2_B_CR
        var Alu1_Rqst_CR     =  Alu1_Used_CR  &  !ALU1_MASK
        var Alu2_Rqst_CR     =  Alu2_Used_CR  &  !ALU2_MASK
        var Alu_Rqsts_Operand_CR  =  Alu1_Rqst_CR  |  Alu2_Rqst_CR

#Bs_Used means the Barrel Shifter uses an operand instead of an instant
        #  A value of 1000 means use an operand
        #  If the operand equals 1000 itself, something very wonderful happens
        var Bs_Used_CR    =  BS.3    &  !BS.2  &  !BS.1  &  !BS.0
        var Bs_Rqst_CR    =  Bs_Used_CR  &  !BS_MASK   #BS requests Operand var 0_Operands_Passed_CR  =  !NUM_OPS.1  &  !NUM_OPS.0  &  !Alu_Rqsts_Operand_CR
        var 1_Operands_Passed_CR  =  !NUM_OPS.1  &  NUM_OPS.0

#A zero Operand arithmetic N-Struction is currently being fetched -
        #  there are no operands expressed or implied
        var OOperand_N_Struction  =  (0_Operands_Passed_CR  |  \
           (1_Operands_Passed_CR & !Mult_Rqsts_Operand_CR & !Alu_Rqsts_Operand_CR))\
           & !Bs_Rqst_CR    & !A_C \
           & (N_FETCHER_state == N_FETCH)

#I had to pull out the OOperand_N_Struction here
        #b/c the Cruncher was starting right after Dspp_Reset
        #but now I put it back, let's see what happens
        var Computation_Ready = Exactly_1Rqst_CR  |  OPERANDS_READY_L  |  OOperand_N_Struction owner
        #Cruncher_Code REDCHIP
        #Donald Gray
       #The Cruncher FSM
        #The Cruncher opens wide the floodgates to the computation engine.

#define temporary variables
        temp Mult1 16
        end
        temp Mult2 16
        end
        temp Mult_Result 20
        end
        temp Alu_A 20
        end
        temp Alu_B 20
        end
        temp Alu_Result 20
        end
        temp Bs_Result 20
            format Bs_Hi_Lo
                field Bs_Result16 16
                field Bs_Result4 4
            endformat
        end
        temp Use_Carry 1     #The ALU op is either an addc or subb
        end

70
```

- 67 -

```
       macro FLOODGATES
       #open the Floodgates to allow the data from the BUF1's into the BUF2's
       # the data will stay here and will be used for computation until
       # the accume and status latches have been latched
           latch MULT1_BUF2 = MULT1_BUF1
           latch MULT2_BUF2 = MULT2_BUF1
           latch MULT_SELECT_BUF2 = MULT_SELECT_BUF1

#The operands going into the ALU MUX need left
           # justification from 16 to 20 bits
           latch ALU1_BUF2HI = ALU1_BUF1
           latch ALU1_BUF2LO = 0
           latch ALU2_BUF2HI = ALU2_BUF1
           latch ALU2_BUF2LO = 0
           latch ALU_MUX_BUF2 = ALU_MUX_BUF1
           latch ALU_MUX_BUF2 = ALU_MUX_BUF1
           latch ALU_SELECT_BUF2 = ALU_SELECT_BUF1
           latch BS_SELECT_BUF2 = BS_SELECT_BUF1
           latch BS_TYPE_BUF2 = BS_TYPE_BUF1
           latch COMPUTE_WAIT_BUF2 = COMPUTE_WAIT_BUF1
           #must try to clear this bit
           set OP_RDY_R_CR
           #Switch the COMP_L so the cruncher knows
           # which write to associate with this computation
           if COMP_L
              unset COMP_L
           else
              set COMP_L
           endif endmacro FLOODGATES
       fsm CRUNCHER need to clear the tlatch fudge
       unset OP_RDY_R_CR

       #Hand optimized logic for the WRITE_ADDRESS_BUS:
       # This bus either takes input from the WRITE0_L or the WRITE1_L
       # If this is a MOVE, use the opposite latch as indicated by ARITH_L
       # If this is not a MOVE, use the latch that corresponds to COMP_L
       # if the state is HANG_LOOSE. If the state is not HANG_LOOSE, use
       # the latch that corresponds to !COMP_L
       switch
          case ( (WR_MOVE_0 & ARITH_L) !| \
              (!WR_MOVE_0 & ((CRUNCHER_state==HANG_LOOSE) ^ COMP_L)) )
                  calc WRITE_ADDRESS_BUS = WRITE1_L
          case ( (WR_MOVE_0 & ARITH_L) | \
              (!WR_MOVE_0 & ((CRUNCHER_state==HANG_LOOSE) ^ COMP_L)) )
                  calc WRITE_ADDRESS_BUS = WRITE0_L
       endswitch
       #Hand optimized logic for the WRITE_DATA_BUS:
       # This bus takes either the MOVE_L or the ACCUME[19:4]
       # It depends solely on the WR_MOVE_0 signal
       switch
          case (WR_MOVE_0)
             calc WRITE_DATA_BUS = MOVE_L
          case (!WR_MOVE_0)
             calc WRITE_DATA_BUS = ACCUME16
       endswitch
       if Dspp_Reset
          goto HANG_LOOSE
       else 70        switch
```

- 68 -

```
        case CRUNCHER_state == HANG_LOOSE
            #Cruncher is in this state if someone else is bottlenecking the system

#Waiting around until the data is ready
            if !GWILLING
                #Now is not the time
                if COMPUTE_DONE_O
                    output COMPUTE_DONE_O
                endif
                if WRITE_O
                    output WRITE_O
                endif
                goto   HANG_LOOSE
            else if JUST_RESET_O
                goto HANG_LOOSE else
                #Do a write if called for
                #If there is a write and MOVE at the same time
                #  the write is delayed
                if COMP_L
                    #this is a "1" arithmetic computation
                    if DO_WRITE1_L & !WR_MOVE_O #and a write is called for
                        #calc WRITE_ADDRESS_BUS = WRITE1_L
                        #calc WRITE_DATA_BUS = ACCUME16
                        latch Data[WRITE_ADDRESS_BUS] = WRITE_DATA_BUS
                        output WRITE_O
                        unset DO_WRITE1_L
                    endif
                else
                    #this is a "0" arithmetic computation
35.                 if DO_WRITE0_L  & !WR_MOVE_O #and a write is called for
                        #calc WRITE_ADDRESS_BUS = WRITE0_L
                        #calc WRITE_DATA_BUS = ACCUME16
                        latch Data[WRITE_ADDRESS_BUS] = WRITE_DATA_BUS
                        output WRITE_O
40                      unset DO_WRITE0_L
                    endif
                endif if WR_MOVE_O
45                  #Time to write a move
                    #The Move from operand was has just been latched
                    if ARITH_L
                    #  moves and computations can be nested
                        #MOVEs are writ to the opposite latches
50                      #  than what ARITH_L specifies
                        #calc WRITE_ADDRESS_BUS = WRITE0_L
                    else
                        #calc WRITE_ADDRESS_BUS = WRITE1_L
                    endif
55
                    #calc WRITE_DATA_BUS = MOVE_L
                    latch Data[WRITE_ADDRESS_BUS] = WRITE_DATA_BUS
                    output WRITE_O
                endif
60
                if Computation_Ready
                    if ( (Exactly_1Rqst_CR & Any_Indirect_CR & \
                        !(OPERAND_LOADER_state == INDIRECTION) ) \
                        |(OOperand_N_Struction & (OPERAND_LOADER_state == INDIRECTION)) \
65                      |JUST_BRANCHED_O )
                        #The Operand_Loader is currently fetching
                        #  the final operand and it is indirect.
                        #  Wait for it to be ready unless the OP_LOADER
                        #  is already in INDIRECTION.
70                      #OR This is a OOp. nstrucion after an arith with an indirect
```

- 69 -

```
                    # so wait (BLUE bug #1)
                    #OR This follows a PC modifier so wait (BLUE BUG #3)
                    goto HANG_LOOSE
                else
                    #Open the Floodgates
                    $FLOODGATES
                    goto CALCULATING
                endif
            else
                #nothing to do
                goto HANG_LOOSE
            endif
        endif
        case CRUNCHER_state == CALCULATING
            if !GWILLING
                if COMPUTE_DONE_O
                    output COMPUTE_DONE_O
                endif
                if WRITE_O
                    output WRITE_O
                endif
                goto CALCULATING
            else
                #Do a write if called for
                #If there is a write and MOVE at the same time
                #  the write is delayed
                if !COMP_L
                    #this is a "0" arithmetic computation
                    #so look for writes to "1" (the last arith)
                    if DO_WRITE1_L & !WR_MOVE_O
                        #calc WRITE_ADDRESS_BUS = WRITE1_L
                        #calc WRITE_DATA_BUS = ACCUME16
                        latch Data[WRITE_ADDRESS_BUS] = WRITE_DATA_BUS
                        output WRITE_O
                        unset DO_WRITE1_L
                    endif
                else
                    #this is a "1" arithmetic computation
                    #so look for writes to "0" (the last arith)
                    if DO_WRITE0_L  & !WR_MOVE_O
                        #calc WRITE_ADDRESS_BUS = WRITE0_L
                        #calc WRITE_DATA_BUS = ACCUME16
                        latch Data[WRITE_ADDRESS_BUS] = WRITE_DATA_BUS
                        output WRITE_O
                        unset DO_WRITE0_L
                    endif
                endif

#Do a MOVE if called for
                if WR_MOVE_O
                    #Time to write a move
                    #The Move from operand was has just been latched
                    if ARITH_L
                    #  moves and computations can be nested
                        #MOVEs are writ to the opposite latches
                        #  than what ARITH_L specifies
                        #calc WRITE_ADDRESS_BUS = WRITE0_L
                    else
                        #calc WRITE_ADDRESS_BUS = WRITE1_L
                    endif calc WRITE_DATA_BUS = MOVE_L
                    latch Data[WRITE_ADDRESS_BUS] = WRITE_DATA_BUS
                    output WRITE_O
                endif
```

- 70 -

```
        switch
            case COMPUTE_WAIT_BUF2.3 | COMPUTE_WAIT_BUF2.2 | COMPUTE_WAIT_BUF2.1
                #more computation to do
                shift COMPUTE_WAIT_BUF2
                goto CALCULATING case COMPUTE_WAIT_BUF2.0
                #Mult and ALU computation will be done at end of this tick
                #Status results will be valid at the end of this tick

#Compute the result
                #ALU or multiplier uses the carry bit
                #  this is an emulator only variable b/c the
                #  carry/borrow stuff is done in the H.W.
                calc Use_Carry   = !ALU_SELECT_BUF2.3   &   (ALU_SELECT_BUF2.2  ^
    ALU_SELECT_BUF2.1) & ALU_SELECT_BUF2.0
                calc Mult1 = MULT1_BUF2

#The second mult input depends on the setting of the
                #  mult_select bit and whether the ALU is performing
                #  an operation that uses the carry.
                calc MHI = Use_Carry ? \
                    CARRY : ACCUMEHI     #Put the carry in the high bit
                calc MLO = Use_Carry ? \
                    0 : ACCUMELO #Put zeroes in the low bits
                calc Mult2 = MULT_SELECT_BUF2 ? \
                    MULT2_BUF2 : ACCUME_CARRY  #ACCUME value or 0/-1 calc Mult_Result = mult_func function ( Mult1,Mult2)

switch
                    case (!ALU_MUX_BUF2.3 & !ALU_MUX_BUF2.2)
                        calc Alu_A = ACCUME
                    case (!ALU_MUX_BUF2.3 & ALU_MUX_BUF2.2)
                        calc Alu_A = ALU1_BUF2
                    case (ALU_MUX_BUF2.3 & !ALU_MUX_BUF2.2)
                        calc Alu_A = ALU2_BUF2
                    case (ALU_MUX_BUF2.3 & ALU_MUX_BUF2.2)
                        calc Alu_A = Mult_Result
                endswitch switch
                    case (!ALU_MUX_BUF2.1 & !ALU_MUX_BUF2.0)
                        calc Alu_B = ACCUME
                    case (!ALU_MUX_BUF2.1 & ALU_MUX_BUF2.0)
                        calc Alu_B = ALU1_BUF2
                    case (ALU_MUX_BUF2.1 & !ALU_MUX_BUF2.0)
                        calc Alu_B = ALU2_BUF2
                    case (ALU_MUX_BUF2.1 & ALU_MUX_BUF2.0)
                        calc Alu_B = Mult_Result
                endswitch

#  I am assuming we have CARRY/!BORROW
                if Use_Carry
                    #If this is ADDC (add with carry) operation,
                    #  or a SUBB (subtract with borrow) operation
                    #  use word with carry/borrow in bit #4 instead of Alu_B
                    calc ALUBHI = 0
                    calc ALUBMID = CARRY
                    calc ALUBLO = 0
                else
                    calc ALUB_CARRY = Alu_B
                endif calc Alu_Result = alu_func function ( ALU_SELECT_BUF2,Alu_A,ALUB_CARRY )

calc Bs_Result = bs_func function ( BS_SELECT_BUF2, \
                    BS_TYPE_BUF2, Alu_Result )

latch STATUS.4 = NEGATIVE
```

```
                        -  71 -
                latch STATUS.3 = VERFLOW
                latch STATUS.2 = CARRY
                latch STATUS.1 = ZERO
                latch STATUS.0 = XACT

#End of all computation,
                #The write is done at the end of the next tick latch ACCUME = Bs_Result

Let OPERAND_LOADER know the computation finished
                # So it can know that a write could occur
                output COMPUTE_DONE_O shift COMPUTE_WAIT_BUF2

*****NOTE: reopen floodgates and
                #          go back to CALCULATING if another computation
                #          is called for.
                if Computation_Ready
                    if ( (Exactly_1Rqst_CR & Any_Indirect_CR & \
                        !(OPERAND_LOADER_state == INDIRECTION) ) \
                        |(OOperand_N_Struction & (OPERAND_LOADER_state == INDIRECTION)) \
                        |JUST_BRANCHED_O )
                        #The Operand_Loader is currently fetching
                        # the final operand and it is indirect.
                        # Wait for it to be ready unless the OP_LOADER
                        # is already in INDIRECTION.
                        #OR This is a OOp. nstrucion after an arith with an indirect
                        # so wait (BLUE bug #1)
                        #OR This follows a PC modifier so wait (BLUE BUG #3)
                        goto HANG_LOOSE
                    else
                        #Open the Floodgates
                        $FLOODGATES
                        goto CALCULATING
                    endif
                else
                    #nothing to do
                    goto HANG_LOOSE
                endif default
                debug ERROR: COMPUTE_WAIT_BUF2 improperly set in Cruncher
            endswitch
        endif endswitch endif
end
```

We claim:

1. Computer apparatus, for use with a memory having data stored in a plurality of addresses,
   means for fetching processing instructions including a first instruction having a control portion and at least one source operand identifier, each source operand identifier in said first instruction having a respective write-back bit;
   means for fetching data from a first address in said memory in response to said first instruction, said first address being determined in response to a first one of said source operand identifiers:
   means for processing said data,
   means for writing said processed data back to said first address in said memory in response to the write-back bit for said first source operand identifier:
   an address bus coupled to said memory, said means for fetching data including means for placing said first address on said address bus;
   an address storage element coupled to said address bus; and
   means for writing said first address from said address bus into said address storage element in conjunction with data being fetched from said first address in said memory if said write-back bit for said first source operand identifier is active,
   and wherein said means for writing said processed data includes means for placing said first address from said address storage element onto said address bus without having reloaded said first address into said address storage element.

2. Apparatus according to claim 1, wherein said instruction further has an indirect bit, and wherein said means for fetching data includes means for determining said first address by indirection from said first source operand identifier, in response to said indirect bit.

3. A method for use with a memory having data stored in a plurality of addresses, an address bus coupled to said memory, and an address storage element coupled to said address bus, and for use further with processing instructions including a first instruction, comprising the steps of:
   fetching data from a first address in said memory in response to said first instruction, said first instruction comprising a control portion and at least one source operand identifier, each source operand identifier in said first instruction having a respective write-back bit, said first address being determined in response to a first one of said source operand identifiers;
   placing said first address on said address bus;
   writing said first address from said address bus into said address storage element if said write-back bit for said first source operand identifier is active;
   processing said data; and
   writing said processed data back to said first address in said memory in response to the write-back bit for said first source operand identifier, including placing said first address from said address storage element onto said address bus without having reloaded said first address into said address storage element.

4. A method according to claim 3, wherein said first instruction further has an indirect bit, and wherein said step of fetching includes a step of determining said first source address by indirection from said first operand identifier, in response to said indirect bit.

5. A method for use with a memory having data stored in a plurality of addresses, a data bus and an address bus both coupled to said memory and an address storage element coupled to said address bus, and for use further in processing instructions including a first instruction, comprising the steps of:
   fetching data from a first address in said memory in response to said first instruction, said first instruction comprising a control portion, at least one source operand identifier and an indirect bit, each source operand identifier in said first instruction having a respective write-back bit, said first address being determined in response to a first one of said source operand identifiers; and including determining said first source address by indirection from said first operand identifier, in response to said indirect bit;
   placing said first address on said data bus from said memory;
   writing said first address from said data bus into said address storage element if said write-back bit for said first source operand identifier is active;
   processing said data; and
   writing said processed data back to said first address in said memory in response to the write-back bit for said first source operand identifier, including placing said first address from said address storage element onto said address bus without having reloaded said first address into said address storage element.

6. A method for use with a memory having data stored in a plurality of addresses, and for use further with processing instructions including a first instruction having a second source operand identifier and a write-back bit for said second source operand identifier, comprising the steps of:
   fetching data from a first address in said memory in response to said first instruction, said first instruction comprising a control portion and at least one source operand identifier, each source operand identifier in said first instruction having a respective write-back bit, said first address being determined in response to a first one of said source operand identifiers;
   fetching data from a second address in said memory in response to said first instruction, said second address being determined in response to said second source operand identifier;
   processing said data;
   writing said processed data back to said first address in said memory in response to the write-back bit for said first source operand identifier; and
   writing said processed data back to said second address in said memory in response to the write-back bit for said second source operand identifier.

7. Computer apparatus, for use with a memory having data stored in a plurality of addresses, comprising:
   means for fetching processing instructions including a first instruction having a control portion, an indirect bit and at least one source operand identifier, each source operand identifier in said first instruction having a respective write-back bit;
   means for fetching data from a first address in said memory in response to said first instruction, said first address being determined in response to a first one of said source operand identifiers, and including means for determining said first address by indirection from said first source operand identifier, in response to said indirect bit;
   means for processing said data;
   means for writing said processed data back to said first address in said memory in response to the write-back bit for said first source operand identifier;

a data bus and an address bus both coupled to said memory, said means for determining said first address by indirection including means for placing said first address on said data bus from said memory;

an address storage element coupled to said address bus; and means for writing said first address from said data bus into said address storage element in conjunction with data being fetched from said first address in said memory if said write-back bit for said first source operand identifier is active, including means for placing said first address from said address storage element onto said address bus without having reloaded said first address into said address storage element.

8. Computer apparatus, for use with a memory having data stored in a plurality of addresses, comprising:

means for fetching processing instructions including a first instruction having a control portion; a second source operand identifier and a write-back bit for said second source operand identifier, and at least one source operand identifier, each source operand identifier in said first instruction having a respective write-back bit, means for fetching data from a first address in said memory in response to said first instruction, said first address being determined in response to a first one of said source operand identifiers, means for fetching data from a second address in said memory in response to said first instruction, said second address being determined in response to said second source operand identifier;

means for processing said data;

means for writing said processed data back to said first address in said memory in response to the write-back bit for said first source operand identifier, and means for writing said processed data back to said second address in said memory in response to the write-back bit for said second source operand identifier.

* * * * *